(12) United States Patent
Villanueva Gaviola et al.

(10) Patent No.: US 11,950,101 B2
(45) Date of Patent: Apr. 2, 2024

(54) CHECKPOINT IDENTITY VERIFICATION USING MOBILE IDENTIFICATION CREDENTIAL

(71) Applicant: Apple Inc., Cupertino, CA (US)

(72) Inventors: Haya Iris Villanueva Gaviola, San Jose, CA (US); Gianpaolo Fasoli, Burlingame, CA (US); Vinay Ganesh, San Jose, CA (US); Irene M. Graff, Cupertino, CA (US); Martijn Theo Haring, Utrecht (NL); Ahmer A. Khan, San Jose, CA (US); Franck Farian Rakotomalala, Dublin, CA (US); Gordon Y. Scott, Cupertino, CA (US); Ho Cheung Chung, San Jose, CA (US); Antonio Allen, San Jose, CA (US); Mayura Dhananjaya Deshpande, San Carlos, CA (US); Thomas John Miller, San Jose, CA (US); Christopher Sharp, Fort Myers, FL (US); David W. Silver, Los Altos, CA (US); Policarpo B. Wood, San Jose, CA (US); Ka Yang, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/398,723

(22) Filed: Aug. 10, 2021

(65) Prior Publication Data

US 2021/0377742 A1 Dec. 2, 2021

Related U.S. Application Data

(63) Continuation of application No. 17/180,509, filed on Feb. 19, 2021, now Pat. No. 11,206,544.

(Continued)

(51) Int. Cl.
*H04L 29/06* (2006.01)
*H04L 29/08* (2006.01)
(Continued)

(52) U.S. Cl.
CPC ............. *H04W 12/69* (2021.01); *H04W 4/80* (2018.02); *H04W 12/02* (2013.01);
(Continued)

(58) Field of Classification Search
CPC ....... H04W 12/69; H04W 4/80; H04W 12/47; H04W 12/037; H04W 12/02
(Continued)

(56) References Cited

U.S. PATENT DOCUMENTS

| 2,013,027 A | 9/1935 | Branch |
| 8,353,448 B1 | 1/2013 | Miller et al. |

(Continued)

FOREIGN PATENT DOCUMENTS

| AU | 2021213717 A1 | 2/2022 |
| CN | 101689188 A | 3/2010 |

(Continued)

OTHER PUBLICATIONS

Corrected Notice of Allowance received for U.S. Appl. No. 17/030,259, dated Apr. 4, 2022, 2 pages.
(Continued)

*Primary Examiner* — Haresh N Patel
(74) *Attorney, Agent, or Firm* — DLA Piper LLP (US)

(57) ABSTRACT

An embodiment includes a method to increase the efficiency of security checkpoint operations. A security checkpoint kiosk serves as a Relying Party System (RPS). The RPS establishes a secure local connection between the RPS and a User Mobile-Identification-Credential Device (UMD). The RPS sends a user information request to the UMD, via the secure local connection, seeking release of user information (Continued)

associated with a Mobile Identification Credential (MIC). The RPS obtains authentication of the user information received in response to the user information request. The RPS retrieves user travel information based on the user information. The RPS determines that the user travel information matches the user information. When the user travel information matches the user information, the RPS approves the user to proceed past the security checkpoint kiosk.

24 Claims, 20 Drawing Sheets

Related U.S. Application Data

(60) Provisional application No. 63/052,275, filed on Jul. 15, 2020, provisional application No. 63/009,243, filed on Apr. 13, 2020.

(51) Int. Cl.
```
H04W 4/80       (2018.01)
H04W 12/02      (2009.01)
H04W 12/037     (2021.01)
H04W 12/47      (2021.01)
H04W 12/69      (2021.01)
G06Q 50/26      (2012.01)
H04L 29/00      (2006.01)
```

(52) U.S. Cl.
CPC ......... *H04W 12/037* (2021.01); *H04W 12/47* (2021.01); *G06Q 50/265* (2013.01)

(58) Field of Classification Search
USPC ............................................... 713/189
See application file for complete search history.

(56) References Cited

U.S. PATENT DOCUMENTS

| | | | |
|---|---|---|---|
| 8,381,969 | B1 | 2/2013 | Miller et al. |
| 8,466,875 | B2 | 6/2013 | Nakada et al. |
| 8,827,153 | B1 | 9/2014 | Rhoades et al. |
| 8,850,196 | B2 | 9/2014 | Blanco et al. |
| 8,943,187 | B1 | 1/2015 | Saylor |
| 9,147,117 | B1 | 9/2015 | Madhu et al. |
| 9,348,492 | B1 | 5/2016 | Penilia et al. |
| 9,485,251 | B2 | 11/2016 | White et al. |
| 10,032,100 | B2 | 7/2018 | Mullen et al. |
| 10,163,105 | B1 | 12/2018 | Ziraknejad et al. |
| 10,164,975 | B1 | 12/2018 | Son et al. |
| 10,223,631 | B2 | 3/2019 | Mullen et al. |
| 10,234,953 | B1 | 3/2019 | Li et al. |
| 10,242,351 | B1 | 3/2019 | Wilson et al. |
| 10,255,545 | B2 | 4/2019 | Mullen et al. |
| 10,275,956 | B1 | 4/2019 | Gehret et al. |
| 10,282,727 | B2 | 5/2019 | Van Os et al. |
| 10,332,104 | B2 | 6/2019 | Prakash et al. |
| 10,339,521 | B1 | 7/2019 | Bodkin et al. |
| 10,366,387 | B2 | 7/2019 | Aabye et al. |
| 10,503,912 | B1 | 12/2019 | Kerr |
| 10,701,067 | B1 | 6/2020 | Ziraknejad et al. |
| 10,776,779 | B1 | 9/2020 | Ellis et al. |
| 10,853,791 | B1 | 12/2020 | Ellis et al. |
| 10,878,437 | B2 | 12/2020 | Ye et al. |
| 11,127,013 | B1 | 9/2021 | Boyd et al. |
| 11,157,918 | B1 | 10/2021 | Ellison et al. |
| 11,182,774 | B1 | 11/2021 | Boyd et al. |
| 11,312,207 | B1 | 4/2022 | Sanders et al. |
| 2002/0120867 | A1 | 8/2002 | Mitchell et al. |
| 2005/0099275 | A1 | 5/2005 | Kamdar et al. |
| 2006/0255906 | A1 | 11/2006 | Ghabra et al. |
| 2007/0079136 | A1 | 4/2007 | Vishik et al. |
| 2007/0214357 | A1 | 9/2007 | Baldus et al. |
| 2008/0041936 | A1 | 2/2008 | Vawter |
| 2008/0048022 | A1 | 2/2008 | Vawter |
| 2008/0184037 | A1 | 7/2008 | Johnson |
| 2008/0214150 | A1 | 9/2008 | Ramer et al. |
| 2009/0320125 | A1 | 12/2009 | Pleasant et al. |
| 2010/0026503 | A1 | 2/2010 | Proefke et al. |
| 2010/0075656 | A1 | 3/2010 | Howarter et al. |
| 2011/0077983 | A1* | 3/2011 | Hua ................... G06Q 10/02 705/5 |
| 2011/0119743 | A1 | 5/2011 | Gleim et al. |
| 2011/0131494 | A1 | 6/2011 | Ono et al. |
| 2011/0165859 | A1 | 7/2011 | Wengrovitz |
| 2011/0282785 | A1 | 11/2011 | Chin |
| 2012/0129493 | A1 | 5/2012 | Vasudevan |
| 2012/0200390 | A1* | 8/2012 | Saravanan ............. G07C 9/27 340/5.61 |
| 2012/0323664 | A1 | 12/2012 | Klems |
| 2013/0024371 | A1 | 1/2013 | Hariramani et al. |
| 2013/0046600 | A1 | 2/2013 | Coppinger |
| 2013/0073459 | A1 | 3/2013 | Zacarias et al. |
| 2013/0275008 | A1 | 10/2013 | Breed |
| 2013/0304642 | A1 | 11/2013 | Campos |
| 2014/0047331 | A1 | 2/2014 | Feldman et al. |
| 2014/0129053 | A1 | 5/2014 | Kleve et al. |
| 2014/0129255 | A1 | 5/2014 | Woodson et al. |
| 2014/0207537 | A1 | 7/2014 | Joyce et al. |
| 2014/0244494 | A1 | 8/2014 | Davis et al. |
| 2014/0258110 | A1 | 9/2014 | Davis et al. |
| 2014/0279519 | A1 | 9/2014 | Mattes et al. |
| 2014/0304173 | A1 | 10/2014 | Ernsdorff |
| 2014/0365466 | A1 | 12/2014 | Chu et al. |
| 2015/0053757 | A1 | 2/2015 | Williams et al. |
| 2015/0074774 | A1 | 3/2015 | Nema et al. |
| 2015/0271175 | A1 | 9/2015 | Je et al. |
| 2015/0278780 | A1 | 10/2015 | Vaidyanathan et al. |
| 2015/0348001 | A1 | 12/2015 | Van Os et al. |
| 2016/0006719 | A1 | 1/2016 | Khalil et al. |
| 2016/0018525 | A1 | 1/2016 | Lanzagorta |
| 2016/0050193 | A1 | 2/2016 | Kanov et al. |
| 2016/0055322 | A1 | 2/2016 | Thomas |
| 2016/0055511 | A1 | 2/2016 | Chidella et al. |
| 2016/0057138 | A1 | 2/2016 | Hoyos et al. |
| 2016/0070447 | A1 | 3/2016 | Righter et al. |
| 2016/0072794 | A1 | 3/2016 | Engert |
| 2016/0078143 | A1 | 3/2016 | Huang et al. |
| 2016/0078581 | A1 | 3/2016 | Maher |
| 2016/0134599 | A1 | 5/2016 | Ross et al. |
| 2016/0180332 | A1 | 6/2016 | Wilczynski |
| 2016/0252978 | A1 | 9/2016 | Yoo et al. |
| 2016/0259497 | A1 | 9/2016 | Foss et al. |
| 2016/0294831 | A1 | 10/2016 | Borunda et al. |
| 2016/0295005 | A1 | 10/2016 | Schussmann et al. |
| 2016/0300054 | A1 | 10/2016 | Turgeman et al. |
| 2016/0373458 | A1 | 12/2016 | Moreton et al. |
| 2017/0032485 | A1 | 2/2017 | Vemury |
| 2017/0053470 | A1 | 2/2017 | Bergerhoff et al. |
| 2017/0091765 | A1 | 3/2017 | Lloyd et al. |
| 2017/0109901 | A1* | 4/2017 | Raj ..................... G06T 5/001 |
| 2017/0120864 | A1 | 5/2017 | Fischer et al. |
| 2017/0124312 | A1 | 5/2017 | Inoue |
| 2017/0140642 | A1 | 5/2017 | Kim |
| 2017/0151928 | A1 | 6/2017 | Kang et al. |
| 2017/0169528 | A1* | 6/2017 | Kundu ................. H04L 65/765 |
| 2017/0213211 | A1 | 7/2017 | Sibert et al. |
| 2017/0243200 | A1 | 8/2017 | Vaidyanathan et al. |
| 2017/0248946 | A1 | 8/2017 | Ogura et al. |
| 2017/0286656 | A1 | 10/2017 | Kohli |
| 2017/0343200 | A1 | 11/2017 | Lai et al. |
| 2017/0357520 | A1 | 12/2017 | De Vries et al. |
| 2018/0018595 | A1 | 1/2018 | Scott et al. |
| 2018/0018664 | A1 | 1/2018 | Purves et al. |
| 2018/0029560 | A1 | 2/2018 | Mohaupt et al. |
| 2018/0033034 | A1 | 2/2018 | Ye et al. |
| 2018/0041503 | A1 | 2/2018 | Lindemann |
| 2018/0103414 | A1 | 4/2018 | Golsch |
| 2018/0108031 | A1 | 4/2018 | Jones et al. |
| 2018/0130044 | A1 | 5/2018 | Gage et al. |
| 2018/0165655 | A1* | 6/2018 | Marcelle ................. G07F 9/001 |
| 2018/0167387 | A1 | 6/2018 | Bhatt et al. |

(56) References Cited

U.S. PATENT DOCUMENTS

| | | | |
|---|---|---|---|
| 2018/0186333 A1 | 7/2018 | Santiano et al. | |
| 2018/0191501 A1 | 7/2018 | Lindemann | |
| 2018/0195874 A1 | 7/2018 | Andrew et al. | |
| 2018/0260553 A1 | 9/2018 | Hoyos et al. | |
| 2018/0265095 A1 | 9/2018 | Joe et al. | |
| 2018/0276657 A1 | 9/2018 | Cho et al. | |
| 2018/0322488 A1 | 11/2018 | Arana et al. | |
| 2018/0335928 A1 | 11/2018 | Van Os et al. | |
| 2018/0336327 A1 | 11/2018 | Wallace et al. | |
| 2018/0349581 A1 | 12/2018 | Ramalingam | |
| 2018/0357846 A1 | 12/2018 | Chen | |
| 2018/0367946 A1* | 12/2018 | Best | H04W 4/021 |
| 2019/0036688 A1 | 1/2019 | Wasily et al. | |
| 2019/0043148 A1* | 2/2019 | Vemury | G06K 19/06037 |
| 2019/0057412 A1* | 2/2019 | Bhattacharjee | G06Q 20/387 |
| 2019/0061687 A1 | 2/2019 | Khalil | |
| 2019/0080070 A1 | 3/2019 | Van Os et al. | |
| 2019/0080189 A1 | 3/2019 | Van Os et al. | |
| 2019/0092279 A1 | 3/2019 | Jarvis et al. | |
| 2019/0163876 A1* | 5/2019 | Remme | G16H 40/20 |
| 2019/0164165 A1* | 5/2019 | Ithabathula | G06F 21/34 |
| 2019/0197527 A1 | 6/2019 | Agarwalla et al. | |
| 2019/0213820 A1 | 7/2019 | Sebes et al. | |
| 2019/0220662 A1 | 7/2019 | Shenouda Dawoud | |
| 2019/0263356 A1 | 8/2019 | Golsch et al. | |
| 2019/0287111 A1* | 9/2019 | Cvetkovich | H04L 9/3226 |
| 2019/0305949 A1 | 10/2019 | Hamel et al. | |
| 2019/0327228 A1 | 10/2019 | Pantfoerder et al. | |
| 2019/0364020 A1 | 11/2019 | Wardell et al. | |
| 2019/0370781 A1 | 12/2019 | Van Os et al. | |
| 2020/0020196 A1* | 1/2020 | Petersen | G07F 17/3218 |
| 2020/0034553 A1 | 1/2020 | Kenyon et al. | |
| 2020/0065822 A1 | 2/2020 | Lin et al. | |
| 2020/0079320 A1 | 3/2020 | Lacoss-Arnold | |
| 2020/0084039 A1 | 3/2020 | Chabanne et al. | |
| 2020/0168306 A1 | 5/2020 | Chen et al. | |
| 2020/0211031 A1 | 7/2020 | Patil | |
| 2020/0269811 A1 | 8/2020 | Kim et al. | |
| 2020/0320653 A1* | 10/2020 | Hastings | G08B 21/182 |
| 2020/0349244 A1 | 11/2020 | Kim et al. | |
| 2020/0391049 A1* | 12/2020 | Moffat | G06F 3/048 |
| 2021/0004792 A1 | 1/2021 | Kikinis et al. | |
| 2021/0014678 A1* | 1/2021 | Seagraves | H04W 4/029 |
| 2021/0089635 A1 | 3/2021 | Weeresinghe | |
| 2021/0127233 A1 | 4/2021 | Santavicca et al. | |
| 2021/0229630 A1 | 7/2021 | Kramar et al. | |
| 2021/0266500 A1 | 8/2021 | Taylor et al. | |
| 2021/0287768 A1 | 9/2021 | Craig et al. | |
| 2021/0319468 A1 | 10/2021 | Zhu et al. | |
| 2021/0319862 A1 | 10/2021 | Boyd et al. | |
| 2021/0321263 A1 | 10/2021 | Boyd et al. | |
| 2021/0373744 A1 | 12/2021 | Miller et al. | |
| 2021/0373745 A1 | 12/2021 | Chang | |
| 2021/0374714 A1 | 12/2021 | Chang | |
| 2021/0374750 A1 | 12/2021 | Miller et al. | |
| 2022/0135001 A1 | 5/2022 | Alsina et al. | |
| 2022/0277295 A1 | 9/2022 | Robinson-Morgan et al. | |
| 2022/0332285 A1 | 10/2022 | Sanders et al. | |
| 2022/0391481 A1 | 12/2022 | Villanueva Gaviola et al. | |
| 2022/0391482 A1 | 12/2022 | Villanueva Gaviola et al. | |
| 2023/0039942 A1 | 2/2023 | Young et al. | |
| 2023/0089689 A1 | 3/2023 | Pons Bordes et al. | |
| 2023/0234537 A1 | 7/2023 | Kramar et al. | |
| 2023/0394128 A1 | 12/2023 | Gaviola | |
| 2023/0394899 A1 | 12/2023 | Young | |

FOREIGN PATENT DOCUMENTS

| | | | |
|---|---|---|---|
| CN | 103635923 A | 3/2014 | |
| CN | 105190659 A * | 12/2015 | G06Q 20/105 |
| CN | 105338066 A | 2/2016 | |
| CN | 105787755 A | 7/2016 | |
| CN | 107609865 A | 1/2018 | |
| CN | 109353309 A | 2/2019 | |
| CN | 110086609 A | 8/2019 | |
| CN | 110135872 A | 8/2019 | |
| EP | 2981115 A2 | 2/2016 | |
| EP | 3460692 A1 | 3/2019 | |
| EP | 3476670 A1 | 5/2019 | |
| EP | 3926888 A1 | 12/2021 | |
| JP | 2013-37568 A | 2/2013 | |
| JP | 2016-133969 A | 7/2016 | |
| JP | 2016-526211 A | 9/2016 | |
| JP | 2018-136886 A | 8/2018 | |
| JP | 2018-156283 A | 10/2018 | |
| JP | 2019-46122 A | 3/2019 | |
| JP | 2019-95880 A | 6/2019 | |
| JP | 2019-191753 A | 10/2019 | |
| JP | 2019-535931 A | 12/2019 | |
| KR | 10-2013-0035286 A | 4/2013 | |
| KR | 10-2013-0131956 A | 12/2013 | |
| KR | 10-1509596 B1 | 4/2015 | |
| KR | 10-2015-0066892 A | 6/2015 | |
| KR | 10-1684188 B1 | 12/2016 | |
| KR | 10-2062919 B1 | 1/2020 | |
| KR | 10-2020-0108515 A | 9/2020 | |
| WO | 2008/157016 A1 | 12/2008 | |
| WO | 2013/003210 A3 | 2/2013 | |
| WO | 2014/146186 A1 | 9/2014 | |
| WO | 2015/153154 A1 | 10/2015 | |
| WO | 2015/194135 A1 | 12/2015 | |
| WO | 2016/128569 A1 | 8/2016 | |
| WO | 2017/078635 A1 | 5/2017 | |
| WO | 2017/218490 A1 | 12/2017 | |
| WO | 2018/071674 A1 | 4/2018 | |
| WO | 2018/074504 A1 | 4/2018 | |
| WO | 2019/069129 A1 | 4/2019 | |
| WO | 2019/191213 A1 | 10/2019 | |
| WO | 2020/197694 A1 | 10/2020 | |
| WO | 2021/038298 A2 | 3/2021 | |

OTHER PUBLICATIONS

Non-Final Office Action received for U.S. Appl. No. 17/222,568, dated Sep. 16, 2022, 32 pages.
Notice of Acceptance received for Australian Patent Application No. 2021213717, dated Sep. 21, 2022, 3 pages.
Applicant-Initiated Interview Summary received for U.S. Appl. No. 17/030,260, dated May 5, 2022, 2 pages.
Corrected Notice of Allowance received for U.S. Appl. No. 17/484,306, dated Mar. 30, 2022, 4 pages.
International Search Report and Written Opinion received for PCT Patent Application No. PCT/US2021/057325, dated Jan. 5, 2022, 14 pages.
Applicant-Initiated Interview Summary received for U.S. Appl. No. 17/030,260, dated Oct. 11, 2022, 2 pages.
Applicant-Initiated Interview Summary received for U.S. Appl. No. 17/077,820, dated Oct. 6, 2022, 2 pages.
International Search Report and Written Opinion received for PCT Patent Application No. PCT/US2022/025365, dated Sep. 27, 2022, 16 pages.
Non-Final Office Action received for U.S. Appl. No. 17/375,767, dated Sep. 29, 2022, 10 pages.
Non-Final Office Action received for U.S. Appl. No. 17/030,260, dated Jul. 8, 2022, 36 pages.
Notice of Allowance received for U.S. Appl. No. 17/030,256, dated Jul. 20, 2022, 9 pages.
Final Office Action received for U.S. Appl. No. 17/030,256, dated Mar. 14, 2022, 20 pages.
Final Office Action received for U.S. Appl. No. 17/030,260, dated Mar. 9, 2022, 42 pages.
Applicant-Initiated Interview Summary received for U.S. Appl. No. 17/030,257, dated Aug. 29, 2022, 5 pages.
Non-Final Office Action received for U.S. Appl. No. 17/077,820, dated Aug. 31, 2022, 10 pages.
Office Action received for Danish Patent Application No. PA202170598, dated Sep. 7, 2022, 4 pages.
Applicant Initiated Interview Summary received for U.S. Appl. No. 17/030,260, dated Jan. 7, 2022, 2 pages.

(56) References Cited

OTHER PUBLICATIONS

Applicant-Initiated Interview Summary received for U.S. Appl. No. 17/030,257, dated Feb. 7, 2022, 5 pages.
Applicant-Initiated Interview Summary received for U.S. Appl. No. 17/030,259, dated Nov. 19, 2021, 18 pages.
Certificate of Examination received for Australian Patent Application No. 2021100511, dated Nov. 5, 2021, 2 pages.
Corrected Notice of Allowance received for U.S. Appl. No. 17/030,259, dated Jan. 5, 2022, 2 pages.
Decision to Grant received for Danish Patent Application No. PA202170032, dated Feb. 1, 2022, 2 pages.
Intention to Grant received for Danish Patent Application No. PA202170032, dated Oct. 6, 2021, 2 pages.
International Search Report and Written Opinion received for PCT Patent Application No. PCT/US2021/015123, dated Aug. 9, 2021, 20 pages.
International Search Report and Written Opinion received for PCT Patent Application No. PCT/US2021/033051, dated Oct. 29, 2021, 20 pages.
Invitation to Pay Addition Fees received for PCT Patent Application No. PCT/US2021/015123, dated Jun. 16, 2021, 12 pages.
Invitation to Pay Additional Fees received for PCT Patent Application No. PCT/US2021/033051, dated Aug. 26, 2021, 10 pages.
Juan, "Everything you can do with Wechat QR codes in 2019", Available online at <https://qpsoftware.net/blog/wechat-qr-code>, Jul. 1, 2019, 13 pages.
Linelovers, "4 ways to add someone to your Line friends list", Available online at: <http://line-lovers-world.com/2016/10/23/%E3%80%90line-app%E3%80%914-ways-to-add-someone-to-your-line-friends-list/>, Oct. 23, 2016, 14 pages.
Lurey C., "Keeper fortifies industry best security architecture with integrated two-factor codes", Online available at:- <URL: <https://www.keepersecurity.com/blog/2019/08/29/keeper-fortifies-industry-best-securityarchitecture-with-integrated-two-factor-codes/>, Aug. 29, 2019, 8 pages.
Mack Brandon, "How Do Snapchat's Snapcodes Work?", Available online at: <https://blackatlascreative.com/blog/how-do-snapchats-snapcodes-work/>, Nov. 10, 2015, 10 pages.
Meet Your Model 3, Available Online at: https://www.tesla.com/support/meet-your-tesla/model-3#keys, 2021, 3 pages.
Non-Final Office Action received for U.S. Appl. No. 17/030,256, dated Jan. 18, 2022, 20 pages.
Non-Final Office Action received for U.S. Appl. No. 17/030,259, dated Aug. 19, 2021, 20 pages.
Non-Final Office Action received for U.S. Appl. No. 17/030,260, dated Oct. 6, 2021, 43 pages.
Non-Final received for U.S. Appl. No. 17/030,257, dated Dec. 24, 2021, 24 pages.
Notice of Allowance received for U.S. Appl. No. 17/030,259, dated Dec. 14, 2021, 8 pages.
Notice of Allowance received for U.S. Appl. No. 17/180,509, dated Apr. 28, 2021, 16 pages.
Notice of Allowance received for U.S. Appl. No. 17/180,509, dated Aug. 23, 2021, 14 pages.
Notice of Allowance received for U.S. Appl. No. 17/484,306, dated Nov. 26, 2021, 9 pages.
Office Action received for Australian Patent Application No. 2021100511, dated May 26, 2021, 5 pages.
Office Action received for Australian Patent Application No. 2021100511, dated Sep. 2, 2021, 3 pages.
Office Action received for Australian Patent Application No. 2021102823, dated Aug. 24, 2021, 8 pages.
Office Action received for Australian Patent Application No. 2021102823, dated Nov. 24, 2021, 7 pages.
Office Action received for Danish Patent Application No. PA202170032, dated May 7, 2021, 7 pages.
Sibila Alex, "Tesla App Full Walkthrough (Mar. 2020)", Available Online at: <https://www.youtube.com/watch?v=RHMWPj_RXLU>, Mar. 16, 2020, 3 pages.

"Use your iPhone or Apple Watch as a Car Key", Available Online at: <https://support.apple.com/en-us/HT211234>, Mar. 16, 2021, 5 pages.
"Vovlo on Call app: Operating Remote Start of the Car", Available Online at: <https://www.volvocars.com/en-ca/support/topics/volvo-on-call/app/volvo-on-call-app-operating-remote-start-of-the-car-2>, Nov. 5, 2020, 4 pages.
Applicant-Initiated Interview Summary received for U.S. Appl. No. 17/375,767, dated Oct. 27, 2022, 4 pages.
International Preliminary Report on Patentability received for PCT Patent Application No. PCT/US2021/015123, dated Aug. 11, 2022, 14 pages.
Invitation to Pay Additional Fees received for PCT Patent Application No. PCT/US2022/025365, dated Aug. 4, 2022, 9 pages.
Applicant-Initiated Interview Summary received for U.S. Appl. No. 17/485,086, dated Dec. 23, 2022, 2 pages.
Final Office Action received for U.S. Appl. No. 17/375,767, dated Dec. 29, 2022, 13 pages.
Notice of Allowance received for U.S. Appl. No. 17/077,820, dated Jan. 6, 2023, 11 pages.
Applicant-Initiated Interview Summary received for U.S. Appl. No. 17/030,256, dated Feb. 23, 2022, 2 pages.
Office Action received for Australian Patent Application No. 2021102823, dated Feb. 22, 2022, 5 pages.
Office Action received for Australian Patent Application No. 2021213717, dated Feb. 10, 2022, 4 pages.
Search Report and Opinion received for Danish Patent Application No. PA202170598, dated Feb. 15, 2022, 11 pages.
Applicant-Initiated Interview Summary received for U.S. Appl. No. 17/030,257, dated Jan. 31, 2023, 7 pages.
Corrected Notice of Allowance received for U.S. Appl. No. 17/077,820, dated Jan. 19, 2023, 2 pages.
Intention to Grant received for Danish Patent Application No. PA202170598, dated Jan. 16, 2023, 2 pages.
Notice of Allowance received for U.S. Appl. No. 17/485,086, dated Jan. 30, 2023, 9 pages.
Office Action received for Korean Patent Application No. 10-2021-0151108, dated Jan. 13, 2023, 10 pages (5 pages of English Translation and 5 pages of Official Copy).
Advisory Action received for U.S. Appl. No. 17/030,260, dated Dec. 13, 2022, 4 pages.
Advisory Action received for U.S. Appl. No. 17/485,086, dated Sep. 9, 2022, 5 pages.
Applicant Initiated Interview Summary received for U.S. Appl. No. 17/485,086, dated Apr. 26, 2022, 2 pages.
Applicant-Initiated Interview Summary received for U.S. Appl. No. 17/030,260, dated Nov. 29, 2022, 2 pages.
Cease, Dictionary.com, Merriam-Webster, 2022, 1 page.
Corrected Notice of Allowance received for U.S. Appl. No. 17/485,098, dated Oct. 13, 2022, 8 pages.
Final Office Action received for U.S. Appl. No. 17/030,257, dated Dec. 8, 2022, 29 pages.
Final Office Action received for U.S. Appl. No. 17/485,086, dated May 4, 2022, 21 pages.
International Preliminary Report on Patentability received for PCT Patent Application No. PCT/US2021/033051, dated Dec. 8, 2022, 14 pages.
International Search Report and Written Opinion received for PCT Patent Application No. PCT/US2022/030567, dated Dec. 9, 2022, 24 pages.
Invitation to Pay Additional Fees and Partial International Search Report received for PCT Patent Application No. PCT/US2022/030567, dated Sep. 13, 2022, 13 pages.
Non-Final Office Action received for U.S. Appl. No. 17/485,086, dated Jan. 24, 2022, 19 pages.
Non-Final Office Action received for U.S. Appl. No. 17/485,086, dated Nov. 14, 2022, 22 pages.
Notice of Allowance received for U.S. Appl. No. 17/485,098, dated Aug. 5, 2022, 12 pages.
August, et al., "Mobile web searching", Bell Lab Technical Journal, vol. 6, No. 2, 2002, pp. 84-98.
Corrected Notice of Allowance received for U.S. Appl. No. 17/030,256, dated Nov. 9, 2022, 8 pages.

(56) References Cited

OTHER PUBLICATIONS

Dahan, et al., "Increasing TeraGrid User Productivity through Integration of Information and Interactive Services", IEEE, 2008, 11 pages.
Final Office Action received for U.S. Appl. No. 17/030,260, dated Nov. 4, 2022, 39 pages.
Notice of Allowance received for Korean Patent Application No. 10-2022-0003867, dated Oct. 21, 2022, 7 pages (2 pages of English Translation and 5 pages of Official Copy).
Office Action received for European Patent Application No. 21707473.1, dated Oct. 31, 2022, 7 pages.
Office Action received for Australian Patent Application No. 2021203367, dated May 23, 2022, 5 pages.
Office Action received for Korean Patent Application No. 10-2022-0003867, dated May 17, 2022, 19 pages (9 pages of English Translation and 10 pages of Official Copy).
Applicant-Initiated Interview Summary received for U.S. Appl. No. 17/030,256, dated Jun. 17, 2022, 2 pages.
Non-Final Office Action received for U.S. Appl. No. 17/030,257, dated Jun. 20, 2022, 27 pages.
Office Action received for Australian Patent Application No. 2021213717, dated Jun. 17, 2022, 4 pages.
Advisory Action received for U.S. Appl. No. 17/222,568, dated Apr. 20, 2023, 5 pages.
Applicant-Initiated Interview Summary received for U.S. Appl. No. 17/375,767, dated Apr. 13, 2023, 2 pages.
Applicant-Initiated Interview Summary received for U.S. Appl. No. 17/375,767, dated Feb. 2, 2023, 2 pages.
Corrected Notice of Allowance received for U.S. Appl. No. 17/077,820, dated Feb. 6, 2023, 2 pages.
Corrected Notice of Allowance received for U.S. Appl. No. 17/077,820, dated Mar. 8, 2023, 2 pages.
Final Office Action received for U.S. Appl. No. 17/222,568, dated Feb. 8, 2023, 68 pages.
Intention to Grant received for Danish Patent Application No. PA202170598, dated Apr. 24, 2023, 2 pages.
International Search Report and Written Opinion received for PCT Patent Application No. PCT/US2022/042978, dated Nov. 29, 2022, 15 pages.
Non-Final Office Action received for U.S. Appl. No. 17/375,767, dated Feb. 16, 2023, 12 pages.
Notice of Allowance received for Japanese Patent Application No. 2022-520133, dated Jan. 27, 2023, 4 pages. (1 page of English Translation and 3 pages of Official Copy).
Notice of Allowance received for Korean Patent Application No. 10-2022-7045895, dated Apr. 19, 2023, 7 pages (2 pages of English Translation and 5 pages of Official Copy).
Notice of Allowance received for U.S. Appl. No. 17/030,260, dated May 3, 2023, 14 pages.
Office Action received for Australian Patent Application No. 2022235545, dated May 11, 2023, 3 pages.
Office Action received for European Patent Application No. 21707473.1, dated May 4, 2023, 5 pages.
Search Report received for Danish Patent Application No. 202270438, dated Dec. 5, 2022, 9 pages.
Advisory Action received for U.S. Appl. No. 17/375,767, dated Jun. 29, 2023, 2 pages.
Applicant-Initiated Interview Summary received for U.S. Appl. No. 17/222,568, dated Aug. 25, 2023, 2 pages.
Applicant-Initiated Interview Summary received for U.S. Appl. No. 17/375,767, dated Jun. 26, 2023, 2 pages.
Corrected Notice of Allowance received for U.S. Appl. No. 17/,030,257, dated Sep. 12, 2023, 2 pages.
Decision to Grant received for Danish Patent Application No. PA202170598, dated Jul. 11, 2023, 1 page.
Extended European Search Report received for European Patent Application No. 23165330.4, dated Jun. 28, 2023, 10 pages.
Final Office Action received for U.S. Appl. No. 17/375,767, dated Jun. 1, 2023, 15 pages.
International Preliminary Report on Patentability received for PCT Patent Application No. PCT/US2021/057325, dated May 19, 2023, 8 pages.
Non-Final Office Action received for U.S. Appl. No. 17/222,568, dated May 25, 2023, 72 pages.
Non-Final Office Action received for U.S. Appl. No. 17/375,767, dated Aug. 31, 2023, 16 pages.
Notice of Acceptance received for Australian Patent Application No. 2022235545, dated Jun. 27, 2023, 3 pages.
Notice of Allowance received for Japanese Patent Application No. 2023-028792, dated Jun. 26, 2023, 4 pages (1 page of English Translation and 3 pages of Official Copy).
Notice of Allowance received for U.S. Appl. No. 17/030,257, dated Jul. 26, 2023, 14 pages.
Notice of Allowance received for U.S. Appl. No. 17/030,260, dated Aug. 7, 2023, 11 pages.
Notice of Allowance received for U.S. Appl. No. 17/030,260, dated Jun. 28, 2023, 11 pages.
Office Action received for Chinese Patent Application No. 202310033917.0, dated Jun. 28, 2023, 19 pages (10 pages of English Translation and 9 pages of Official Copy).
Office Action received for Danish Patent Application No. PA202270438, dated Jul. 10, 2023, 4 pages.
Office Action received for Japanese Patent Application No. 2022-573404, dated Jul. 3, 2023, 12 pages (6 pages of English Translation and 6 pages of Official Copy).
Office Action received for Korean Patent Application No. 10-2023-7010480, dated Jul. 20, 2023, 14 pages (7 pages of English Translation and 7 pages of Official Copy).
Eminagaoglu et al., "A Two-Factor Authentication System with QR Codes for Web and Mobile Applications", 2014 Fifth International Conference on Emerging Security Technologies, 2014, pp. 105-112.
Office Action received for Japanese Patent Application No. 2022-520133, dated Oct. 17, 2022, 4 pages (2 pages of English Translation and 2 pages of Official Copy).
Office Action received for Korean Patent Application No. 10-2021-0151108, dated Sep. 21, 2023, 12 pages (6 pages of English Translation and 6 pages of Official Copy).
Applicant-Initiated Interview Summary received for U.S. Appl. No. 17/375,767, dated Dec. 22, 2023, 2 pages.
Applicant-Initiated Interview Summary received for U.S. Appl. No. 17/900,734, dated Nov. 20, 2023, 4 pages.
Corrected Notice of Allowance received for U.S. Appl. No. 17/030,257, dated Nov. 24, 2023, 2 pages.
Corrected Notice of Allowance received for U.S. Appl. No. 18/128,775, dated Dec. 7, 2023, 2 pages.
Corrected Notice of Allowance received for U.S. Appl. No. 18/128,775, dated Jan. 8, 2024, 2 pages.
Corrected Notice of Allowance received for U.S. Appl. No. 18/128,775, dated Nov. 17, 2023, 2 pages.
Final Office Action received for U.S. Appl. No. 17/222,568, dated Dec. 14, 2023, 92 pages.
International Preliminary Report on Patentability received for PCT Patent Application No. PCT/US2022/030567, dated Dec. 21, 2023, 18 pages.
International Preliminary Report on Patentability received for PCT Patent Application No. PCT/US2022/025365, dated Nov. 2, 2023, 11 pages.
International Search Report and Written Opinion received for PCT Patent Application No. PCT/US2023/023766, dated Nov. 7, 2023, 20 pages.
International Search Report and Written Opinion received for PCT Patent Application No. PCT/US2023/024123, dated Sep. 15, 2023, 11 pages.
Invitation to Pay Additional Fees and Partial International Search Report received for PCT Patent Application No. PCT/US2023/023766, dated Sep. 14, 2023, 14 pages.
Kormann et al., "Risks of the Passport Single Signon Protocol", IEEE Computer Networks, Jul. 2000, 12 pages.
Non-Final Office Action received for U.S. Appl. No. 17/375,767, dated Nov. 28, 2023, 16 pages.
Non-Final Office Action received for U.S. Appl. No. 17/900,734, dated Oct. 24, 2023, 12 pages.

(56) References Cited

OTHER PUBLICATIONS

Notice of Allowance received for Chinese Patent Application No. 202310033917.0, dated Nov. 26, 2023, 2 pages (1 page of English Translation and 1 page of Official Copy).
Notice of Allowance received for Japanese Patent Application No. 2022-573404, dated Dec. 11, 2023, 4 pages (1 page of English Translation and 3 pages of Official Copy).
Notice of Allowance received for Korean Patent Application No. 10-2023-7010480, dated Nov. 29, 2023, 7 pages (2 pages of English Translation and 5 pages of Official Copy).
Notice of Allowance received for U.S. Appl. No. 18/128,775, dated Nov. 2, 2023, 10 pages.
Office Action received for Australian Patent Application No. 2023200021, dated Nov. 1, 2023, 3 pages.
Office Action received for European Patent Application No. 21707473.1, dated Oct. 27, 2023, 5 pages.
Office Action received for European Patent Application No. 21731662.9, dated Oct. 12, 2023, 8 pages.
Office Action received for Japanese Patent Application No. 2023-528157, dated Dec. 8, 2023, 4 pages (2 pages of English Translation and 2 pages of Official Copy).
Office Action received for Korean Patent Application No. 10-2021-0182662, dated Oct. 26, 2023, 13 pages (6 pages of English Translation and 7 pages of Official Copy).
Office Action received for Korean Patent Application No. 10-2021-7037387, dated Oct. 12, 2023, 14 pages (6 pages of English Translation and 8 pages of Official Copy).
Office Action received for Korean Patent Application No. 10-2023-7033718, dated Dec. 4, 2023, 5 pages (2 pages of English Translation and 3 pages of Official Copy).

* cited by examiner

CHECKPOINT IDENTITY VERIFICATION USING MOBILE IDENTIFICATION CREDENTIAL

CROSS-REFERENCE TO RELATED APPLICATIONS

This application is a continuation of U.S. non-provisional application Ser. No. 17/180,509 entitled "Checkpoint Identity Verification On Validation Using Mobile Identification Credential,", now U.S. Pat. No. 11,206,544, filed on Feb. 19, 2021; which claims the benefit of U.S. Provisional Application No. 63/009,243 entitled "Checkpoint Identity Validation Using Mobile Identification Credential," filed on Apr. 13, 2020; and U.S. Provisional Application No. 63/052,275 entitled "Checkpoint Identity Validation Using Mobile Identification Credential," filed on Jul. 15, 2020; the disclosures of all of which are incorporated herein by reference in their entireties.

FIELD

The discussion below relates generally to verifying the identity of a subject at a checkpoint.

BACKGROUND

Staffing and computing resources are devoted to verifying the identity of a subject (also referred to herein as a user, passenger, or traveler) at a security checkpoint. Such staffing and resources are further burdened by a need for manual verification performed by an agent, who checks physical documents from the subject, and checks other sources of information available for the subject. Such resources are even further burdened when attempting to resolve inconsistencies between a subject's travel booking/reservation information, physical documents, and/or identity information. Furthermore, the subject is burdened with a need to check-in with a travel carrier such as an airline, in addition to undergoing the checkpoint experience.

SUMMARY

The detailed description below discloses approaches for the use of a Mobile Identification Credential (MIC) to identify a subject at a checkpoint such as an airline security area. One example of a MIC is a mobile driver license (mDL), also referred to as a digital driver license. The MIC is issued by a MIC provider. The MIC provider, for example, may be a state department of motor vehicles (DMV).

Employment of the MIC may occur within a supportive environment (disclosed in the detailed description, below). The environment may include a user device to which the MIC is provisioned—a User Mobile Identification Credential Device (UMD). Within the environment, a MIC provider, also referred to as an authorizing party (AP), in one embodiment, has an authorizing party system (APS) that may provision the MIC to the UMD. The environment also may include a relying party (RP) that will interact with the UMD by way of a relying party system (RPS). The environment addresses various considerations, including: ID enrollment and proofing, regarding how the user's identity is proofed upon initial enrollment; security, regarding how data is encrypted at rest or in-transit (various encryption algorithms); privacy, regarding how passenger data is kept from being exposed before encryption, and how notice and consent are provided or received before digital identity information is passed to the RPS; integrity, regarding how an encrypted message is authenticated, knowing that data has not been tampered with, or preventing intercepts or replay attacks; and trust, regarding determining that messages or data are sent by a known RPS or device, determining that the identity information received is that of the user as enrolled by the RPS or APS. Embodiments of the environment described herein also address: technical requirements, standards, security policies, and procedures for transmission of digital identity information to RPS readers; and identity verification procedures, including appropriate and relevant requirements or standard operating procedures regarding the interface between systems and passengers through the screening experience (e.g., presentation through the release of an individual by the Traveler Document Checker (TDC)).

In a non-limiting example, a traveler uses their MIC when making an air travel reservation. In this example, the UMD may be a desktop computer of a user, the MIC may be an mDL, the AP may be the state DMV, the APS may be a computer system of the DMV, the RP may be an airline, and the RPS may be a computer system of the airline, also referred to as a travel carrier system. In an alternate example, the RP may be a third-party travel aggregator, with a corresponding RPS computer system, configured to book the user's travel reservations and pass the user's information to the airline and airline computer system.

In an embodiment, the user interacts with the airline via an app running on the user's UMD, or by using the UMD to visit a website operated by the airline. In another embodiment, the user interacts with the airline by using a web-capable device such as a laptop, tablet, desktop computer, or other device that interfaces with the UMD to facilitate online communication between the UMD and the airline (or other online entity). For example, the UMD can be a USB storage device storing a MIC for the user, which is interfaced with the user's laptop serving as a web-capable device. Communication between the web-capable device and the UMD is handled via wired or wireless connections. In an example, the web-capable device and the UMD establish a local connection via a quick response (QR) code scannable by the UMD or via electromagnetic radiation communications such as in near-field communication, Bluetooth, and RFID technologies.

Here, when the user makes their reservation, they may choose to use their MIC to establish their identity with the airline. The user may also choose to release their MIC user information (also referred to as official information), such as name and date of birth, to the RPS for populating data fields when making the reservation. These choices may be made via a dialog conducted between the RPS and the UMD—a release dialog (also referred to as a privacy dialog or, in some examples, a consent dialog). During the dialog, the RPS sends the UMD a user information request. With the permission of the user, in an example, the APS releases the MIC user information requested by the RPS; the RPS populates the reservation with the official name and date of birth associated with the MIC.

In another, non-limiting embodiment, a security checkpoint kiosk serves as a Relying Party System (RPS). Existing equipment (e.g., security checkpoint kiosks of Government entities such as the TSA) can be modified to incorporate hardware or software capabilities described herein. New equipment (e.g., security checkpoint kiosks including electronic readers) also can include or incorporate such capabilities. The capabilities enable the equipment to accept digital identity information. For example, a peripheral wireless reader can be connected to a Credential Authentication Technology (CAT) terminal to wirelessly accept digital identity information, such as MIC user information. The RPS and the UMD establish a secure local connection via a Quick Response (QR) code scannable by the UMD or via electromagnetic radiation communications such as in near-field communication, Bluetooth, and RFID technologies. When the secure local connection is established, the RPS sends, via the secure local connection, a user information request to the UMD to release user information associated with a MIC. The RPS verifies the user information, received in response to the user information request, according to embodiments described more fully below.

Various processes can be integrated into operations performed using such equipment, from multiple perspectives. Such processes include but are not limited to queue management, human factors considerations, hand-off, and digital transmission, to optimize a passenger's identity verification experience as an entry to physical screening.

Additionally, the RPS retrieves user travel information from a travel carrier such as an airline, cruise line, or railway line. The user travel information corresponds to verified user information. Where the user booked the travel reservation using the MIC, the booked user travel information will be the same information as in the MIC user information. The RPS verifies that the user travel information from the travel carrier matches the user information from the MIC. In an embodiment, the RPS provides guidance to proceed past the security checkpoint, upon successfully verifying that the user information is valid, and verifying that the user travel information matches the user information. In another embodiment, the RPS directs one of several types of security checkpoint gates to open, corresponding to a status of the user such as whether the user participates in a registered traveler program.

Using the MIC in these ways improves the overall travel experience for users by (1) avoiding potential mismatches between travel reservation information and actual passenger information; (2) providing readily-accessible, official, biographic and biometric information that reduces the need for network traffic and facilitates cross-checking with airline-supplied manifests; (3) supporting the automated verification of passenger identity at the security checkpoint so as to improve security staffing resource utilization; and (4) enabling the digital presentation of information at the security checkpoint that would otherwise be found on a physical boarding pass. Furthermore, embodiments enhance the experience of the passenger by providing a reminder for the passenger to check in with the travel carrier, or alleviating in some circumstances the requirement that the passenger check in with the travel carrier. Use of the MIC enables Government entities, such as the TSA, to be assured that digital identity information meets identity assurance levels, digital identity information is issued and unchanged to a UMD, digital identity information is authentic, digital identity information originates from the issuing authority, and digital identity information belongs to the person or user presenting it.

Security screening in an air travel context is discussed throughout this application. However, the principles of this disclosure apply to other situations and environments. MIC user information is also referred to as official information. However, such terms are not restricted to official government information, and also include verified information from a non-governmental source. For example, third-party travel support providers or other registered traveler programs can provide official information about an individual, or otherwise interact with a travel carrier, security back end, and/or RPS. In an example, the third-party travel support provider verifies a user identity and generates a trusted third-party identity, which is trusted by TSA. TSA verifies the identity information, and associates a vetting status to the user.

The detailed description below elaborates on the foregoing, non-limiting embodiments, and on other embodiments not mentioned in this summary. Other features and aspects of the embodiments will become apparent to those of ordinary skill in the art from the following detailed description, which discloses, in conjunction with the accompanying drawings, examples that explain the features in accordance with embodiments. This summary is not intended to identify key or essential features, nor is it intended to limit the scope of the invention, which is defined solely by the claims.

BRIEF DESCRIPTION OF THE DRAWINGS

The attached drawings help explain the embodiments described below.

DETAILED DESCRIPTION

Figure 1:
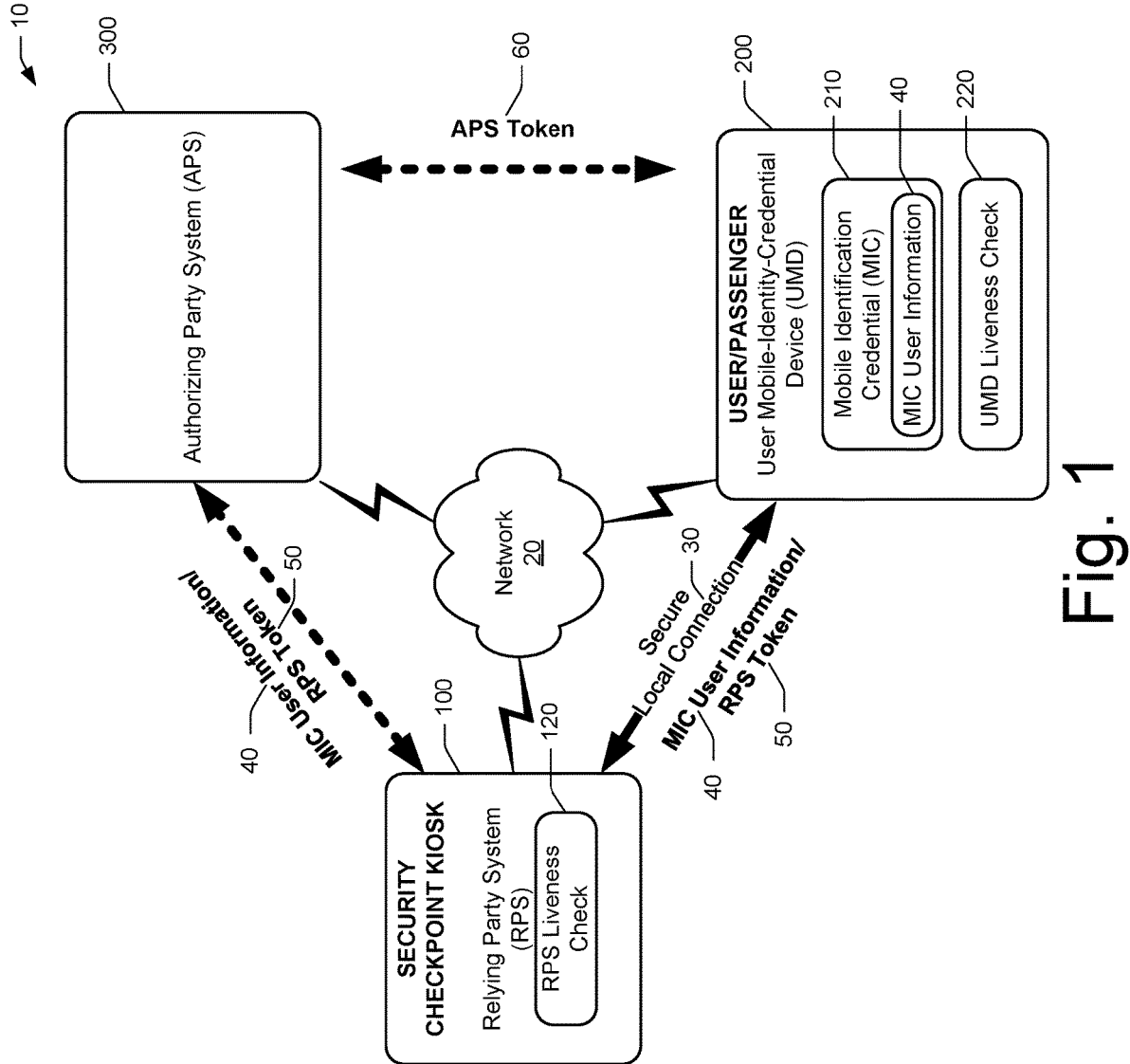
FIG. 1 illustrates an example MIC environment including an example security checkpoint kiosk to obtain authorization of user information according to an embodiment.

In an environment that supports its use, a Mobile Identification Credential (MIC) can enable a user to conveniently prove their identity. One embodiment of a MIC is a mobile driver license (mDL) issued by an official agency such as a state Department of Motor Vehicles (DMV). Another embodiment of a MIC is a mobile passport. A mobile passport may, for example, be issued by the U.S. Department of State or a foreign ministry of another nation. The MIC can include various information, such as information relating to identity or privileges pertaining to the user.

The MIC itself is portable and can be provisioned to devices. Below, the device to which the MIC is provisioned is referred to hereafter as a User Mobile Identification Credential Device (UMD). The term UMD pertains to any device to which a MIC can be provisioned including, without limitation: smart watches, smart fitness bands, smart objects, smart phones, e-readers, tablet computers, smart televisions and displays, smart cameras, laptop computers, desktop computers, servers, kiosks, chips, flash drives, and USB drives.

In an embodiment, the issuer of the MIC (the MIC Issuer) may provision and issue the valid, authentic MIC to the UMD. The issuer of the MIC also may work with a MIC provider to facilitate the provisioning of the MIC to the UMD. The MIC Issuer also may work with a third party to provision the MIC to the UMD. In another embodiment, the user may provision the MIC from one device of the user to another device of the user (for example, from their desktop computer to their smart fitness band).

A MIC may be validated by an Authorizing Party (AP). In one embodiment, the AP is an official agency such as a state DMV. In another embodiment, the AP is a third party empowered by an official agency to perform such verification operations. The AP employs an Authorizing Party System (APS). The APS may provision the MIC to the UMD.

MIC Transactions

MIC transactions can be online or offline. Generally, the UMD may interact or transact with other devices to share some or all of the content of the MIC. The device through which the UMD shares the MIC user information is referred to as a Relying Party System (RPS). The RPS is a system operated by or for a Relying Party (RP). The RPS may obtain MIC user information according to an online mode or an offline mode, based on the RPS being able to trust the MIC user information and perform verification of the MIC user information, as enabled by the environment in which the MIC is used. In an online mode embodiment, the security checkpoint kiosk RPS 100 interacts with the APS 300 to verify the released MIC user information 40. In an offline mode, the security checkpoint kiosk RPS 100 uses a public key from the APS 300 to verify the released MIC user information 40. Generally, data transfers are digitally signed, via electronic certificates, to verify authenticity of the data transferred. In addition to or instead of the use of digital signatures, data transfers are encrypted via public-key cryptography to ensure integrity of the data transfers. Furthermore, data transfers can utilize tokenization to safeguard the online data transfers. Other embodiments rely on combinations of multiple such data protection procedures, as well as other data security best practices.

In some embodiments, secure local or remote connections are established by using session keys, e.g., based on establishing session-specific encryption protocols. A session key is an encryption and decryption key that is randomly generated to ensure the security of a communications session between parties. A session key can be symmetric, used for encryption and decryption. A session key can be public or private. A session key can be ephemeral. As an example, usage of ephemeral public and private keys is described as follows. At initial engagement, a first device (Device 1) will pass its session public key to a second device (Device 2). Device 2 will use its private key and Device 1's public key to generate Device 2's public key. Device 2's public key is shared with Device 1. These ephemeral key pairs are used to encrypt and to decrypt messages sent between Device 1 and Device 2. A session begins when the two devices acknowledge each other and open a virtual connection, and ends when the two devices have obtained the information they need from each other and send "finished" messages, terminating the connection. Embodiments may make use of such session keys or other practices for establishing secure local or remote connections.

Online MIC Transactions

Online MIC transactions can involve trust and verification. An online MIC transaction may involve a UMD transferring MIC user information in response to a request from an RPS. The RPS verifies whether the received MIC user information is valid based on an online connection between the RPS and the APS. In an embodiment, the RPS accesses an electronic certificate from the APS to verify the authenticity of the MIC user information received from the UMD. The UMD digitally signs the MIC user information using the electronic certificate from the APS. The UMD can retrieve the electronic certificate at the time of the transaction, either from the APS or from a certificate repository. In other embodiments, when something other than a public key is used to verify the MIC user information, the RPS will need to submit an electronic document or a digital file or the like to the APS in exchange for a key that may be referred to as an authentication key that is not public. The authentication key may be a public key that refreshes after a very short time, such that the RPS needs to reach out to the APS when it is time to verify the information, and use the public key with a short lifespan before it expires. In other embodiments, cryptography is based on public/private key pairs.

The RPS or the UMD may perform a liveness check, e.g., by comparing collected biometric information to verified credentials. In an embodiment, a security checkpoint kiosk RPS includes a biometric sensor to capture biometric information of the user presenting at the RPS, such as a photograph, a video, a retina scan, a fingerprint, and the like. In another embodiment, the RPS is configured to request a liveness check from the UMD. Due to the nature of the secure local connection as established through the handshake, the trustworthiness of information from the UMD responsive to the request is preserved. Accordingly, in an embodiment, the UMD collects and transfers information that the RPS uses to perform the liveness check. For example, the UMD collects a photograph and fingerprint, and accelerometer information that the RPS uses to determine whether the user's hand motions and/or walking gait are consistent with liveness check information known for the user. In another embodiment, the RPS determines that the UMD is deemed trustworthy for performing its own liveness check, and such liveness determination performed by the UMD is accepted by the RPS. For example, the UMD is a smartphone performing a facial recognition verification, whose valid result the RPS accepts as verification that the proper user is legitimately in possession of the UMD and presenting the UMD at the RPS.

The interaction between the UMD and the RPS may be in-person, where a user is physically located at the RPS to present the UMD to the RPS. The interaction may be attended, where an attendant or other agent attending the RPS witnesses the transaction, to physically compare the appearance of the user, presenting the UMD at the RPS, against the MIC user information contained on the presented UMD. The interaction between the UMD and the RPS also may be remote, where a user is not physically located at or otherwise physically attending the interaction with RPS. For example, the user may be performing an online transaction using the UMD at home, which remotely transmits MIC user information over a remote connection from the UMD to the RPS located remote from the UMD, e.g., at an online web host.

Online MIC Transactions—Trust

The RPS needs to know, or trust, that the MIC user information obtained from the UMD is unchanged and matches official records. Part of this trustworthiness is based on how the MIC was securely provisioned or placed onto the UMD, e.g., according to International Organization for Standardization (ISO) standards. Such secure provisioning enables the RPS to trust the MIC and its MIC user information, and also perform verification that such information matches official records pertaining to the person represented in the MIC user information. Trust also may be based on the reputation of the MIC issuer or APS that provisioned the MIC onto the UMD. Trust further may be based on the trustworthiness of the connection between the RPS and the APS, e.g., based on a connection that is secured by encryption or other technological protections. In an embodiment, trust is also based on the RPS reputation or other information about the RPS, such as Global Positioning System (GPS) coordinates, as detected by the UMD at the location of the transaction between the UMD and the RPS, matching known coordinates for that RPS.

Tokens can be used to establish trust, by exchanging tokens between the UMD, RPS, or APS. In an embodiment, a token or file does not actually contain requested MIC user information. Rather, the token or file includes a consented data indication to indicate which of the user's MIC user information is authorized for release. The APS can exchange the token or file for the MIC user information that is consented to be released by the APS to the RPS. When a user releases MIC user information from the UMD, the UMD passes an RPS token to the RPS, and passes an APS token to the APS. The RPS communicates via an online connection with the APS, which compares the APS token received from the UMD to the RPS token received from the RPS. Upon verifying a match, the APS provides a copy of the MIC user information to the RPS. Thus, the matching of tokens over an online connection enables the APS to trust the transaction and release requested information, via an online connection, to the RPS. Tokens similarly enable the UMD or RPS to trust the transaction. In another embodiment, the UMD sends an RPS token to the RPS and sends an APS token to the APS: the APS releases the MIC user information only if both the RPS token and the APS token are received and only if within a given timeframe.

Online MIC Transactions—Verification

The RPS can verify that the MIC user information is trustworthy. The MIC, as provisioned onto the UMD including the MIC user information, is electronically signed in an embodiment, to enable the RPS to verify that the MIC is provisioned to the proper UMD belonging to the proper user. Embodiments may use other or multiple data protection procedures, as well as other data security best practices to verify information, connections, transaction participants, or the like. In the online context, the RPS has an online connection to the APS. The online connection enables the RPS to request and receive information or verification directly from the APS. Accordingly, the RPS can perform online verification of MIC user information received locally from the UMD, by comparing the local information against information at the APS. The RPS also can perform a local verification of MIC user information received remotely from the APS, e.g., using data protection or verification procedures, or other data verification best practices.

Offline MIC Transactions

Trust and verification also play a role in offline, or disconnected, MIC transactions. The offline context refers to a condition when one or all parties in a transaction do not have an online connection to each other or to the Internet. For example, the RPS may be in an isolated location, or may be suffering from a communications failure, and therefore lack an online connection for communicating with the APS. Transactions may still proceed, based on the ability of the RPS and UMD to establish a local connection with each other based on trust and verification. An offline MIC transaction may involve the RPS verifying whether the received MIC user information is valid, without the RPS having an online connection, e.g., without communicating to an external system such as the APS that can verify whether MIC user information received by the RPS is trustworthy. In an embodiment, the RPS verifies a cryptographic signature on the individual data elements of the MIC user information using, e.g., signer certificates. This ensures the data is genuine and unchanged, based on the RPS performing a local verification based on cryptographic operations. In another embodiment, the RPS accesses a copy of an electronic certificate stored locally at the UMD, and periodically refreshes locally stored electronic certificates independently of a given transaction. In some instances, the RPS does not have to submit anything to the APS to obtain a public key for that APS, because the RPS keeps a locally stored copy of that APS key. In an embodiment, the RPS periodically checks with the APS to refresh the locally-stored public keys. In some cases, there may be a public key distributor (PKD). The distributor would be an agent acting on behalf of several trusted entities. This agent would hold the most up-to-date public keys and distribute to trusted relying parties such as the RPS. Offline MIC transactions may be in-person, attended, or remote, as explained above in the context of online MIC transactions.

Offline MIC Transactions—Trust

Similar to the online context, the RPS can establish trustworthiness in a MIC and MIC user information for offline MIC transactions. As explained above, the RPS can verify that the MIC was securely provisioned or placed onto the UMD, and therefore trust the MIC and its MIC user information, based on cryptographic operations. Trust also may be based on reputations of systems that provisioned the MIC onto the UMD, and the trustworthiness of connections or the technological protections used between systems involved in transactions.

Offline MIC Transactions—Verification

The RPS can perform a local, offline verification that the MIC user information is trustworthy, without an online connection. For example, the RPS performs local cryptographic operations to confirm electronic signatures of the MIC and MIC user information obtained from the UMD. In an embodiment, the RPS uses digital signatures or encryption to obtain, locally, verification of MIC user information. Such verification is possible when the RPS receives the MIC user information directly from the UMD instead of the APS, e.g., when the RPS is operating in an offline mode. Thus, the RPS does not contact the APS, but instead uses an offline stored public key of the APS to verify that the MIC user information is trustworthy as received from the UMD.

FIG. 1 illustrates a MIC environment 10 including a security checkpoint kiosk RPS 100 to obtain authorization of MIC user information 40 according to an embodiment. The following discussion provides additional context for the various approaches described above, and embodiments described herein provide various benefits. Briefly, benefits include providing an increase in the efficiency of security checkpoint operations, such as at airline security areas, by enabling a passenger (referred to alternatively as user or traveler) to prove their identity using a MIC 210. In one embodiment, the passenger uses a MIC 210 when booking travel reservations. In another embodiment, the passenger uses the MIC 210 at the airport security checkpoint using kiosk RPS 100, as explained in further detail below in the context of aviation use cases. Using the MIC 210 in these ways improves the system's overall function by avoiding potential mismatches between user travel information and actual passenger information. In addition, the MIC 210 provides readily-accessed, official biographic and biometric information, which reduces the need for network traffic and facilitates cross-checking with airline-supplied manifests. Furthermore, the MIC 210 supports automated verification of the passenger at the security checkpoint via kiosk RPS 100, and thereby improves utilization of security staffing resources. In yet another embodiment, use of the MIC 210 enhances the passenger experience by reminding the passenger to check in with a travel carrier (see FIG. 2), or even by eliminating a need for the passenger to check in with an airline. For example, the security checkpoint kiosk RPS 100 completes verification of the passenger's identity and directs the UMD 200 to prompt the user with a reminder to check in with a travel carrier. In another embodiment, the security checkpoint kiosk RPS 100 facilitates an automated transaction to check in the passenger, or may selectively relay verified passenger information to airline data systems, travel carriers, security back ends, or other parties. In such embodiments, there is no longer a need for the passenger to separately check in with the airline. In other embodiments, there is no need for the passenger to present a physical boarding pass at the checkpoint, because the checkpoint checks with the airline data systems for the travel status of the user independent of the physical boarding pass. Accordingly, the MIC environment 10 enables the checkpoint to identify passengers whose physical boarding pass information is fraudulent or outdated (e.g., in situations where a passenger obtains a legitimate physical boarding pass but is subsequently added to a no-fly list, rendering that user's existing physical boarding pass obsolete).

As already discussed, an environment acts as a system that supports MIC use. To review, the passenger has a MIC 210, including MIC user information 40 or other information or privileges such as those representing a mobile driver's license (mDL), stored on their UMD 200 as part of MIC environment 10 that supports MIC 210 use. In such an environment, a MIC 210 is issued by an Authorizing Party, such as a state department of motor vehicles, using an APS 300. The APS 300 provisions the valid, authentic MIC 210 to the UMD 200, or may have a third-party facilitate provisioning of the MIC 210 to the UMD 200. The APS 300 is available via network communication, as described herein, to interact with the RPS 100 and UMD 200. The UMD 200 interacts with another device to share some or all the content of the MIC 210. The device that is to receive the MIC user information 40 is security checkpoint kiosk RPS 100.

Embodiments of the MIC environment 10 are compatible with multiple, different forms of identification (ID) and corresponding authorizing parties. The MIC 210 is capable of storing multiple different forms of ID simultaneously. For example, the MIC environment 10 supports non-governmental forms of ID, including those from private companies, such as digital identification providers, third-party travel support providers, and the like. Embodiments are compatible with forms of ID and their providers that are authorized by the Transportation Security Administration (TSA) to provide and/or authorize credentials, such as those from registered traveler programs. Furthermore, embodiments are compatible with forms of employee and/or crew member IDs, used to prove employment or crew member status (e.g., by including a verifiable employee/crew member ID number). In an embodiment, the MIC 210 stores a comprehensive form of an ID, such as an employee ID, and a compact form of the ID, such as a badge-in authentication. Accordingly, an employee can interact with a sophisticated security system kiosk to register and provide comprehensive information from the MIC 210 including an employee photograph. Upon registering, the employee can keep a compact employee authorization that the employee uses to perform an expedited badge-in swipe at simple badge-in points at employee entrances and exits.

In the illustrated environment, the RPS 100 is a security checkpoint kiosk that interacts with the user's UMD 200 to request information desired by the relying party (e.g., the party operating the security checkpoint kiosk RPS 100), which in the airline travel context is a security agency such as the TSA. In an embodiment, the user selects whether to release the requested information, and has control sufficient to release the information discretely—in whole or in parts selected by the user. Various techniques can be used to establish trust and verification of MIC user information, as explained above in online and offline contexts. In another embodiment, the RPS 100 conducts an RPS liveness check 120 or the UMD 200 conducts a UMD liveness check 220, to confirm that the user presenting the UMD 200 matches the MIC 210 provisioned on that UMD 200. In yet another embodiment, the APS 300 facilitates the liveness check or checks performed by the RPS 100 or UMD 200, e.g., by processing information collected by the RPS 100 and/or UMD 200 as part of the liveness checks.

Aviation Use Cases

Figure 2:
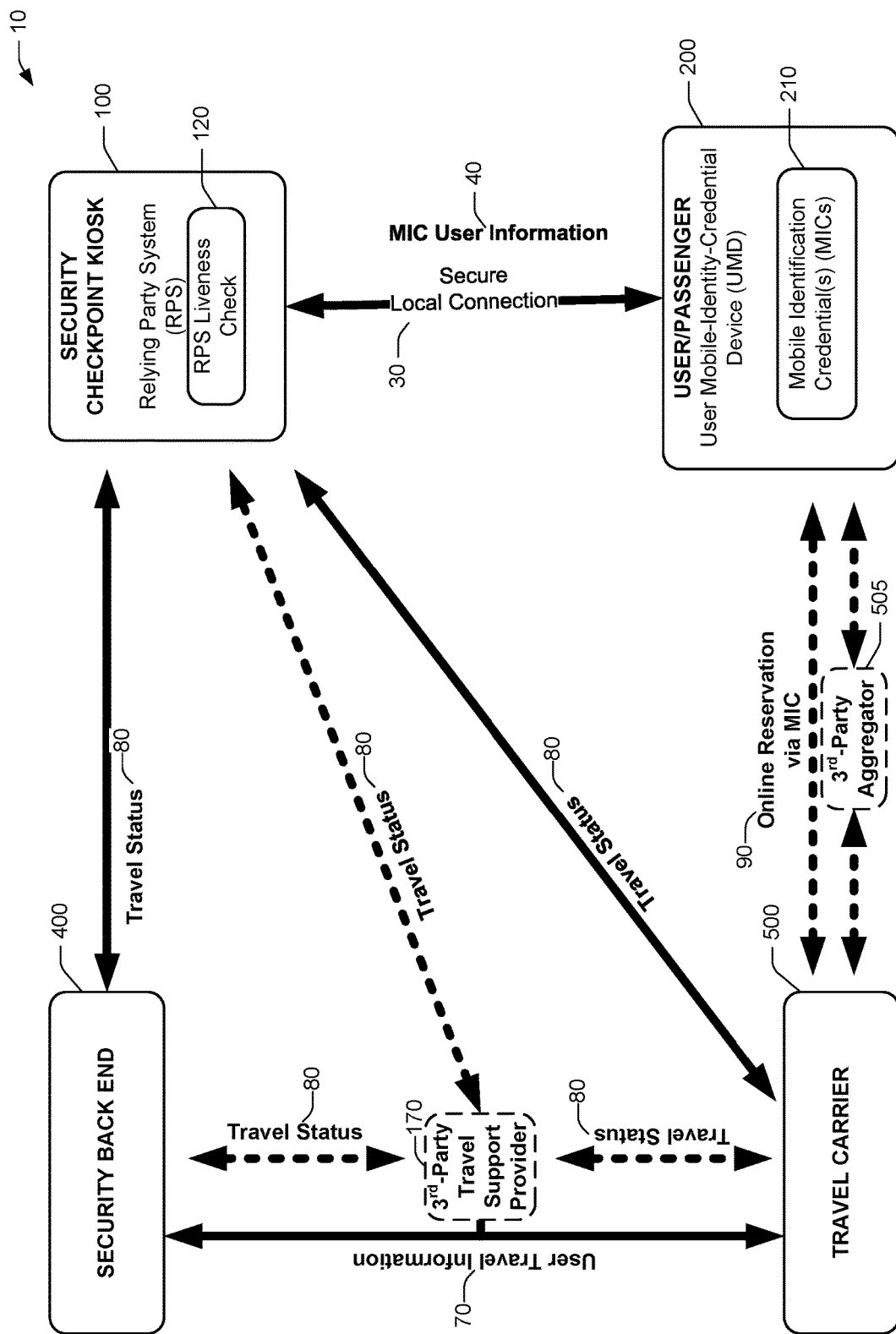
FIG. 2 illustrates an example MIC environment including an example security checkpoint kiosk in the context of aviation use cases according to an embodiment.

FIG. 2 illustrates a MIC environment 10 including a security checkpoint kiosk RPS 100 in the context of aviation use cases. The MIC environment 10 enables multiple MICs to be provisioned to a UMD, such as for a providing identity information, privileges, or other information for multiple different purposes. For example, a user's UMD can hold information or identifications corresponding to a passenger, a crew member, and a registered traveler (RT). The UMD is capable of being provisioned with multiple MICs, such as an mDL MIC that is provisioned on the UMD separate and distinct from an employee or crew member ID or badge that is provisioned on the same UMD. When the user interacts with an RPS via the UMD, the RPS accordingly may communicate with one or multiple APSs for coordinating a transaction.

Booking

The MIC environment 10 provides benefits when booking travel arrangements, whether by users who are passengers, crew members, or registered travelers. A user can book travel arrangements directly with a travel provider such as an airline operator travel carrier 500, or can book through a third-party aggregator 505.

In an embodiment, the user books travel reservations with the third-party aggregator 505, via the MIC 210 as provisioned on the UMD 200. The third-party aggregator 505 passes user information to the travel carrier 500. The third-party aggregator 505 can include travel agencies and booking agencies. In an embodiment, the user manually provides travel information to the third-party aggregator 505. In another embodiment, the user accesses the third-party aggregator 505 using the UMD 200 and uses the MIC 210 on the UMD 200 to pre-populate requests for the user's information as needed by the third-party aggregator 505. A similar pre-populating approach may also be used for users booking directly with travel carrier 500. Accordingly, the user's information is not subject to mismatches at the third-party aggregator 505 or travel carrier 500, whether by data entry errors or other variations such as the user entering a nickname not precisely matching the actual name as stored on the user's MIC. Furthermore, in some embodiments, the third-party aggregator 505 or travel carrier 500 requests additional MIC user information, such as a photograph of the user, or other user information that is germane to booking travel reservations and/or security checkpoint operations. Using the MIC 210 to book travel reservations facilitates providing acceptable or official versions of such additional MIC user information.

Booking—Passenger

In an embodiment, a passenger initiates communication with an airline (travel carrier 500) to make flight reservations, e.g., via a mobile app on the mobile device on which the MIC 210 is provisioned. In this example, the MIC 210 is an mDL issued by the user's Department of Motor Vehicles (DMV). The airline system acts as an RPS to request information from the user, and the airline system verifies information via the DMV serving as the APS. In an embodiment, the user accesses the travel carrier using the UMD and uses the MIC on the UMD to pre-populate the user's information needed by the travel carrier. Accordingly, the user's information is not subject to mismatches, whether by data entry errors or other variations. Furthermore, in some embodiments, the carrier requests additional MIC user information, such as a photograph of the user, or other user information that is germane to booking travel reservations and/or security checkpoint operations. Using the MIC to book travel reservations facilitates providing acceptable/ official such additional MIC user information. In another embodiment, the airline checks with federal authorities to see whether the user information is on an exclusion list such as a no-fly list. In another embodiment, the passenger initiates communication with a third-party travel aggregator 505 to make flight reservations. The third-party aggregator 505 interacts with the user in a similar manner as described above to receive user information from the user when booking reservations via a MIC 210. The third-party aggregator 505 passes on the user information to the travel carrier 500.

Booking—Crew

Crew member users can book travel using the MIC environment 10, similar to how a passenger user can book travel as described above, via a MIC provisioned onto the crew member's UMD. Additionally, the user's UMD can be provisioned with a crew-specific identification information or privileges. The user can use such crew information to register with a security back end, e.g., as part of the crew employment onboarding process via a transaction between the UMD 200 and the security back end. In an embodiment, the security back end is the TSA or other security agency approved by the TSA for verifying the identity of crew members, employees, and other users who are expected to pass through the security checkpoint RPS 100, regardless of whether they have booked travel reservations. In an embodiment, the user manually provides user information to the security back end, such as via an interactive website or employment kiosk. In another embodiment, the user accesses the security back end using the UMD 200 and uses the MIC on the UMD 200 to pre-populate the user's information as needed onto the registration system of the security back end. Accordingly, the user's information is not subject to mismatches, whether by data entry errors or other variations. Furthermore, in some embodiments, the security back end requests additional MIC user information, such as a photograph of the user, or other user information that is germane to crew member employment and/or security checkpoint operations. In another embodiment, the security back end accesses other employment systems, such as a private employer associated with a given user, to obtain employment information directly from the employer on behalf of the user employee.

Booking—Registered Traveler (RT)

Registered Travelers (RTs) can book travel similar to passengers above, whether directly with airlines or through a third-party aggregator service. A user can submit to a background check as part of becoming a member of a registered traveler program, such as those offered by third-party travel support providers.

Vetting

Embodiments perform vetting, whether for a passenger, a crew member, or a registered traveler (RT), as described below.

Passenger Vetting

In an embodiment, at or near the time of travel, the travel carrier 500 sends passenger manifest information to the TSA (e.g., via a security back end 400). Such information enables the TSA to prepare (e.g., "stage") local information for more efficient processing of users who are expected to pass through security. Such information includes official or verified liveness, user identity, or other user travel information 70, and indicates which user travel information 70 is trustworthy as having been obtained through a MIC transaction. The MIC transaction can include a liveness check of the passenger. The information provides the RPS 100 or security back end 400 advance notice of which users or passengers are to be expected. The information is then used by the TSA to verify the identity of the passenger. The TSA then can associate the identity with a vetting status, or otherwise determine and assert a vetting status for the passenger.

Crew Vetting

Similar to passengers as described above, crew members can be vetted using the MIC environment. In an embodiment, the employee or crew member ID includes a credential indicating an employment status of the user. The RPS 100 vets the employment status of the user by communicating with the security back end 400, which will identify the employment or crew member status of the user. For example, the security back end 400 confirms that the user is a pilot whose information matches the MIC of the UMD 200 being presented. In other embodiments, an airport or a travel carrier serves as the APS 300 to provide vetting status or otherwise confirm that the user is trustworthy. The RPS 100 can provide instructions for the crew member user to proceed to an employee or crew member security processing line, or otherwise identify a level of screening appropriate for the user based on the crew member status.

Registered Traveler (RT) Vetting

A user who is also a member of a registered traveler (RT) program, such as those offered by third-party travel support providers 170, also can use the MIC environment for vetting. A third-party travel support provider can provide official information about a user, or can interact with a travel carrier, security back end, and/or RPS to provide information about the user. For example, the third-party travel support provider collects biometric and biographic information from the user when the user arrives at an airport, enabling the third-party travel support provider to perform a liveness check and/or otherwise verify the user's identity, e.g., prior to passing through a security checkpoint.

At some point before travel, the user registers with the third-party travel support provider 170. Similar to the procedure for provisioning a MIC 210 onto the UMD 200, registration with the third-party travel support provider 170 can involve the user establishing an account with the third-party travel support provider 170 (e.g., via the user's MIC 210), and providing corresponding proof of identity documentation and base truth biometric information (including fingerprints, retina scans, and the like), e.g., via the user's MIC 210. The user can submit various registration information, as well as establish identity, to the third-party travel support provider 170 by using the MIC 210, with the third-party travel support provider 170 serving as an RPS. The third-party travel support provider 170 verifies the user's identity, and passes that information on to the security agency such as TSA (e.g., security back end 400), which vets the RT.

More specifically, the third-party travel support provider 170 is configured to receive and provide official information about an individual, or otherwise interact with the travel carrier 500, security back end 400, and/or RPS 100. Such information indicates which user travel information 70 is trustworthy as having been obtained through a MIC transaction. The third-party travel support provider 170 provides user identity and/or travel information, indicating that the user's identity has been verified via the third-party travel support provider 170. The third-party travel support provider 170 forwards such verified liveness, user identity, or travel information and/or results to the security back end 400 or to the security checkpoint kiosk RPS 100. In an embodiment, the third-party travel support provider 170 provides a third-party kiosk that the user visits prior to arriving at the security checkpoint kiosk RPS 100. The third-party travel support provider 170 carries out a liveness check of the user or otherwise verifies user identity or travel information. For example, the user scans a fingerprint at the third-party travel support provider 170 kiosk to log into a third-party account at the third-party travel support provider 170. The third-party travel support provider 170 passes verification results and other such information to the RPS 100 and/or security back end 400. Accordingly, the third-party travel support provider 170 provides the user a "pre-kiosk" (security checkpoint kiosk RPS 100) experience. The RPS 100 or security back end 400 uses the information from the third-party travel support provider 170, enabling the security checkpoint kiosk RPS 100 or security back end 400 to receive advance notice of what users are to be expected from the third-party travel support provider 170. The identity information, as verified by the third-party travel support provider 170 as being valid and authentic, is then used by the TSA to verify the identity of the users. The TSA then can associate the identity with a vetting status, or otherwise determine and assert a vetting status for the passenger.

Identity Verification

The MIC environment 10 enables verification of identities, whether for passengers, crew, or registered travelers, as described in further detail below.

Passenger Identity Verification

At the time of travel, the passenger, also referred to as a user, presents the MIC 210 at a security checkpoint kiosk RPS 100, which serves as an RPS. The security checkpoint kiosk RPS 100 has a dialog with the user via the UMD 200 of the passenger which is locally and securely linked, in an example, via Bluetooth, RFID, near-field communication, or the like. In an embodiment, the user hovers the UMD 200 against a reader (e.g., a near-field reader) attached to a CAT serving as the RPS 100. Such a transaction is envisioned to be constrained by proximity (e.g., two inches or less) between the UMD 200 and a reader of the RPS 100. The reader of the RPS 100 can include a smart antenna to receive and process the transmission in a specific way so as to address confidentiality, integrity, and availability of the transmission, e.g., based on an emerging ISO18013-5 standard. In an embodiment, the CAT serving as the RPS 100 can be a Credential Authentication Technology plus Camera (CAT-C) system, equipped with a "smart reader" to ingest digital identity information (MIC user information) from the UMD. The CAT-C system serving as the RPS 100 can treat the MIC user information the same way it would treat physical identification information, to enable backend security processes as described herein. The CAT-C system serving as the RPS 100 will also match the digital photo, transmitted with the MIC user information, against a live capture of the user's face as captured by the CAT-C, as part of verifying the user's identity.

In another embodiment, an e-gate CAT-C system (also referred to as an AutoCAT) serves as the RPS 100. The e-gate CAT-C includes the functionalities of a CAT-C system, albeit in a different form factor including an automatic e-gate. This allows for a passenger to self-navigate the presentation, transmission, verification, and vetting processes via the e-gate CAT-C, by presenting to the AutoCAT the digital identity on his or her UMD 200. Verifications performed by the AutoCAT may be agent-attended. Depending on security lane configurations, an agent need not attend the AutoCAT on a 1:1 basis. Rather, an agent may monitor user flows at multiple security lines, and resolve issues in cases of identity non-match, mismatch, or anomalies that necessitate manual intervention and resolution. Upon verification, the AutoCAT may trigger the opening of a gate to allow the user to proceed past the AutoCAT.

In another embodiment, the RPS 100 may be a kiosk in electronic communication with a Remote-CAT system. The kiosk enables the UMD 200 to transmit MIC user information remotely to the Remote-CAT system over a distance, without having to bring the UMD 200 in close proximity to the Remote-CAT system. Such distance is envisioned to be an at-distance transmission protocol in which proximity (less than 2") is not a constraint. In an embodiment, at-distance is envisioned to be roughly an area serviced by Bluetooth Low Energy (BLE). After the UMD 200 transmits the MIC user information, the Remote-CAT system 1) performs security verification or vetting for the user associated with the transmitted MIC user information, and 2) stages or prepares a previously stored digital photograph, to be matched against the user's live face when appearing before the Remote-CAT system. Before the user arrives at the Remote-CAT system, the Remote-CAT system uses the MIC user information to perform verification or vetting securely, and to stage a transmitted digital photo in a 1:1 matching solution or a 1:k gallery at the edge, to be matched against an imminent encounter with the user. To recap, for the Remote-CAT system, the user transmits MIC user information to the Remote-CAT. The Remote-CAT stages the transmitted MIC user information, including a digital photograph. The user then eventually passes in front of the Remote-CAT (e.g., after progressing through the security queue), which then proceeds to capture a live photograph or video of the user, to perform facial matching with the staged digital photograph. No additional interactions are needed when passing in front of the Remote-CAT, enhancing user experience and processing efficiency. The user may merely pause in front of the Remote-CAT camera for pre-staged facial matching, and then proceed.

In yet another embodiment, the RPS 100 may be a Remote-Auto-CAT system, which may include a kiosk. Initially, the Remote-Auto-CAT system performs a biometric check or liveness check of the user, via the kiosk or a mobile platform operating on the user's UMD 200. The kiosk establishes a secure connection to the Remote-Auto-CAT system, which is located in the same checkpoint area. The UMD 200 then performs a secure and authenticated transmission of the MIC user information at distance to the Remote-Auto-CAT system. The Remote-Auto-CAT system stages the transmitted MIC user information, in preparation of imminent user encounter (e.g., as the user progresses from the kiosk through the security queue to the Remote-Auto-CAT system). As described above, before the user arrives, the Remote-Auto-CAT system uses the MIC user information to perform verification or vetting securely, and to stage a transmitted digital photo (part of the MIC user information) in a 1:1 matching solution or 1:k gallery at the edge to be matched against an imminent encounter with the user. The user then merely pauses before the Remote-Auto-CAT system as the encounter for facial matching as described above, and upon matching, proceeds past the Remote-Auto-CAT system. Thus, the Remote-Auto-CAT system allows for the user to self-navigate the presentation, transmission, verification, and vetting processes via the Remote-Auto-CAT system, by presenting the MIC user information on his or her mobile device to the Remote-Auto-CAT system at distance without having to be close to the Remote-Auto-CAT system to initiate the transmission.

A QR code may be used to establish the dialog between the UMD 200 and the RPS 100. In an embodiment, the security checkpoint kiosk RPS 100 presents a QR code which the UMD 200 scans. In another embodiment, the UMD 200 displays a QR code which the security checkpoint kiosk RPS 100 scans. The scanning establishes a secure local (close-proximity) connection, between the UMD 200 and the security checkpoint kiosk RPS 100, using respective local connection circuitry. In another example, UMD engagement logic establishes a key exchange protocol usable by the UMD 200, via radio frequency or visual communications. UMD engagement logic encodes a public key in an optically-readable QR code and displays the QR code to the UMD 200. Upon reading the QR code, the UMD 200 responds to the RPS 100 with a key exchange to secure a local connection between the RPS 100 and the UMD 200. In embodiments, the secure local connection utilizes other protocols, such as secure Near Field Communication (NFC), secure Bluetooth, secure Wi-Fi, or the like.

In another embodiment, the UMD 200 wirelessly transmits identity information to the RPS 100, after the passenger has authorized the release of the identity information through a biometric verification of the passenger's identity performed by the RPS 100, or by personnel attending the transaction with the RPS 100. This wireless transmission of identity information to the RPS 100 may alleviate the need for a passenger to present a physical identity document, such as a driver's license. The UMD 200 and the RPS 100 may use a digital handshake to establish a secure local device-to-device wireless communication connection for such transmissions of identity information.

In yet another embodiment, the user interacts with the RPS 100 by using the UMD 200 to perform an initiation with the RPS 100. The UMD 200 and RPS 100 perform a handshake establishing a secure local connection between the UMD 200 and RPS 100. The handshake and secure local connection are implemented according to various embodiments and are initiated by either device. In an embodiment the handshake is based on OpenID Connect. In an embodiment, the RPS 100 includes a Radio-Frequency Identification (RFID) reader and the initiation is based on RFID. The user places the UMD 200 on the RFID reader of the RPS 100, and the RFID reader detects the UMD 200. Such detection is treated as user-initiation of the handshake and proximal consent from the user to the RPS 100, to allow the RPS 100 to perform the handshake with the UMD 200. During the handshake, the UMD 200 and the RPS 100 establish a secure local connection, enabling the RPS 100 and UMD 200 to exchange information securely. In another embodiment, the handshake and connection are based on Wi-Fi Aware.

In an embodiment, the secure local connection is established via, or based on Bluetooth Low Energy (BLE). The RPS and UMD establish their modes, whether BLE central mode (scanning) or BLE peripheral mode (advertising), and exchange connection information such as transmitter signal strength, media access control (MAC) addresses, universally unique identifiers (UUIDs), device names, and the like. Such information, corresponding to BLE, enables the RPS and UMD to establish the local secure connection. In embodiments, the BLE connection provides BLE-specific security measures. In other embodiments, the RPS and UMD apply security at the application layer of the secure local connection, e.g., via cryptography implemented at the RPS and UMD. The secure local connection is established, and data transfers are allowed to begin by the RPS and/or UMD setting a connection state to 'start.'

The user is prompted by the UMD 200 to consent to the release of their MIC user information 40 to the security checkpoint kiosk RPS 100. The MIC user information 40 is releasable directly from the UMD 200 or indirectly from the APS 300, based on the transaction proceeding according to an online mode or offline mode as explained above. The security checkpoint kiosk RPS 100, or the UMD 200, performs a liveness check 120, 220. For example, the checkpoint kiosk RPS 100 compares collected biometric information to verified credentials. In an embodiment, a CAT serving as the RPS 100 touchlessly verifies the MIC user information 40 against stored data, and facially matches the user (e.g., by performing a live camera capture) against a previously stored digital photograph of the user. Such verifications may be agent-attended, to ensure the user proceeds to an appropriate physical screening lane based on an outcome of the user verification. The CAT can include a camera and reader, enabling the CAT to capture user photographs or video and ingest digital MIC user information 40 securely to perform verifications, and also to perform matching of stored digital photographic data against live photographic data. In another embodiment, the security checkpoint kiosk RPS 100 also compares collected biographic information and/or biometric information against an airline system's flight reservation information/manifest. In an embodiment, such comparison is made via a security back end 400, which contains a staged copy of the user travel information 70 from the travel carrier 500.

In another embodiment, the checkpoint kiosk RPS 100 or a security back end uses the verified photograph of the user to stage a gallery of users expected for travel in a given timeframe. Such a gallery conserves resources by using the staged gallery of photographs to perform a 1:n comparison when processing travelers at security checkpoint kiosk RPSs. Furthermore, the staged gallery enables prompt and efficient availability of verified traveler photographs, e.g., as performed at the security back end. The gallery can be used for crew member users expected to arrive at the RPS 100 in a given timeframe (e.g., during the beginning of an expected employment shift, or around the time of expected travel by the crew member assigned to a given flight, and so on). In an embodiment, such photographs stored at the security back end are readily available via security checkpoint kiosk RPSs that are in network communication with the security back end. In another embodiment, one or more of the photographs in the staged gallery are transferred to, and stored at, the security checkpoint kiosk RPSs. In an embodiment, such storage and/or transfers at and/or between the security back end and the security checkpoint kiosk RPSs are controlled and purged, based on time windows corresponding to the travel times of the users depicted in the photos, and/or a total time limit corresponding to how long the gallery and/or copies have been stored.

The MIC environment 10 also enables photographic galleries for more efficient staging and other operations. A traveling user may have previously booked travel reservations at a travel carrier by interacting with the travel carrier's reservation system. The travel carrier allowed booking via a digital ID or mobile ID such as the MIC stored on the user's UMD 200. The travel carrier thereby possesses verified user information, such as the user's photograph and other biometric and/or biographic information. Such information can be staged at the security back end 400 as explained above, for more efficient operation of the MIC environment 10. For example, the security back end stages a photographic gallery for 1:n vetting of passengers. In another embodiment, such information is also propagated to the edge of the MIC system, e.g., at the security checkpoint kiosk RPS 100, enabling the 1:n matching of photographs to be performed at the RPS 100. In embodiments, such comparisons involve a biometric matching between staged information and live captured or verified MIC user information. Furthermore, staging the 1:n gallery with user photographs or other information enables the RPS 100 and/or security back end to reference and access such staged information efficiently. For example, the RPS 100 merely handshakes with the UMD 200 to access the locally stored copies of corresponding MIC user information, without needing to devote computing resources to transferring potentially large data files such as photographs, because such photographs are already pre-staged. In embodiments, the RPS 100 presents a QR code or RFID scan/tap to access the stored or staged record corresponding to the staged gallery of user information. Thus, in such embodiments, at the point of transaction, the security agency operating the RPS 100 (e.g., TSA) already has the user data pre-loaded and ready to use. Such readiness is facilitated by the security back end or RPS 100 accessing manifest or staging information being kept particularly fresh or relevant based on expected arrival times of travelers, without needing to clutter the staged information with users who are not expected to arrive for travel within a given timeframe. In embodiments, the security back end is provided by the TSA, or agencies authorized by the TSA, such as those capable of verifying the identity of users and their traveler status. In other embodiments, the RPS 100 and/or security back end are configured to vet users that do not have travel reservations, but otherwise have a legitimate reason to pass through the security checkpoint kiosk. Accordingly, the travel status vetting by the RPS 100 is achieved without a need for the user to present a boarding pass at the security checkpoint kiosk RPS 100.

Another benefit provided by the MIC environment 10 is for preparing users so that their UMD is ready ahead of time, before arriving at the security checkpoint kiosk RPS 100. For example, a QR code greets the user upon entering a first queue leading up to the security checkpoint kiosk RPS 100. The user scans the QR code using the UMD, and the UMD sets itself to operate in UMD mode (e.g., launching the UMD app for interacting with the security checkpoint kiosk RPS 100), or presents the user with instructions for readying the UMD device for interacting with the security checkpoint kiosk RPS 100. Accordingly, the security checkpoint kiosk RPS 100 efficiently processes users, who are already prepared in advance to interact with the security checkpoint kiosk RPS 100 using their UMDs. In another embodiment, the UMD automatically detects a beacon, geolocation information, or other local signal indicating the user is entering the queue prior to the security checkpoint kiosk RPS 100. The UMD then automatically launches the UMD app and alerts the user to be ready for interacting with the security checkpoint kiosk RPS 100.

The passenger's UMD then proceeds to establish the secure local connection and carry out identity verification with the APS or RPS as described above.

Crew Identity Verification

Similar to the passenger identity verification as described above, crew members can establish a secure local connection and carry out identity verification. When arriving at the security checkpoint RPS 100, the RPS 100 also can request the crew member's employee or crew member specific information, such as an employee ID number. Such requested information is 1) used to verify the identity of the user, and 2) used to verify the user information against the registration or other information staged for the crew member, or otherwise accessible. For example, the security back end 400 or security checkpoint kiosk RPS 100 may contact a known crew member (KCM) database to access information against which the crew member's MIC user information is compared. Manifest information or staging information corresponds to verifying against a valid employment or crew member status or identity.

Registered Traveler (RT) Identity Verification

When traveling, the user arrives at a travel venue and accesses a user account at the third-party travel support provider 170. For example, the third-party travel support provider is a third-party kiosk that is configured to check the user's biometrics or otherwise perform a liveness check on the user. In an example, the third-party travel support provider scans the user's fingerprint to grant access to an account at the third-party travel support provider 170. Upon successfully verifying the identity of the user, the third-party travel support provider 170 then transmits third-party results to the security checkpoint kiosk RPS 100. Such third-party results inform the security checkpoint kiosk RPS 100 that the user has been successfully verified as matching a registered third-party user account, and that the security checkpoint kiosk RPS 100 should expect the user. Such information by the third-party travel support provider 170 informs the security checkpoint kiosk RPS of the user's name, flight information, photograph, or other information about the user which the security checkpoint kiosk RPS stages. The user then proceeds from the third-party travel support provider 170 to the security checkpoint kiosk RPS 100, which can be staged with information from the third-party travel support provider 170 for providing additional pre-staged processing efficiencies as described above.

Additional Interactions and Use Cases in the MIC Environment

The MIC environment 10 enables additional benefits in the context of travel and checkpoint experiences. For example, upon positive verification of the user travel information 70 or travel status 80, the security checkpoint kiosk RPS 100 can prompt the user, or direct the UMD 200 to prompt the user, with a reminder to check in with the traveler carrier 500. In another embodiment, the security checkpoint kiosk RPS 100 updates a travel status 80 with the travel carrier 500, e.g., by transmitting a user status indication to the travel carrier 500 on whose flight manifest the passenger's name is found.

In another embodiment, upon positive verification, the security checkpoint kiosk RPS 100 identifies whether the user is on a select list, such as a registered traveler program, and selectively directs the user to proceed accordingly. For example, the security checkpoint kiosk RPS 100 directs the user to proceed to a registered traveler program line. If the user is not on a select list, the security checkpoint kiosk RPS 100 directs the user elsewhere, allowing the user to proceed to a normal line.

Figure 3:
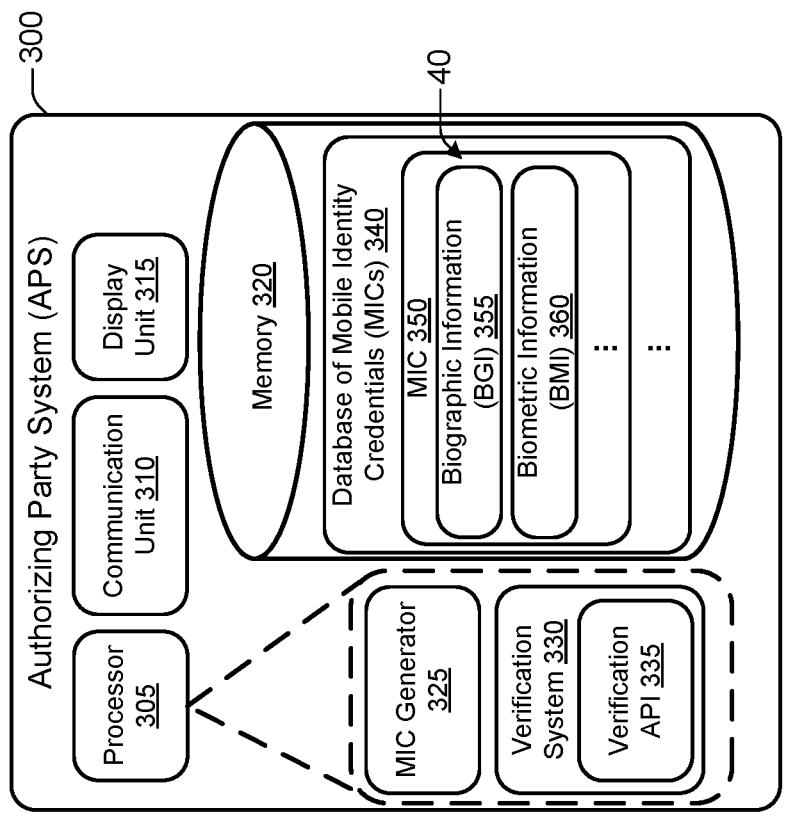
FIG. 3 illustrates an Authorizing Party System (APS) according to an embodiment.

FIG. 3 illustrates an Authorizing Party System (APS) 300 according to an embodiment. The APS 300 includes a processor 305, communication unit 310, display unit 315, and memory 320. The processor 305 is associated with logic and/or modules to process information, including a MIC generator 325 and a verification system 330 with a verification Application Programming Interface (API) 335.

The MIC generator 325 enables the APS 300 to generate a MIC 350 for a given user. For example, the MIC generator 325 receives unique information about the user, such as a social security number. The APS 300 can reside in a local DMV office staffed with agents to verify physical documents in person, to traditionally verify that the social security number belongs to that user. The MIC generator 325 creates a framework to build the MIC 350 for the user and populates the MIC 350 with corresponding biographic and biometric information 355, 360, e.g., as available locally at the DMV office. In embodiments, the MIC generator 325 populates the MIC 350 with other information corresponding to the user, such as driving privileges or special access. For example, the MIC 350 can be issued or provisioned by the Federal Government, and include special access, privileges, or MIC user information corresponding to positions at Federal Government agencies. In an example, the APS is located at the DMV, and an agent of the DMV collects and manually verifies proof of identity that the user provides to the agent in person. In an embodiment, a kiosk at the DMV performs a liveness check of the user and/or otherwise performs unattended verification of the proof of identity that the user provides to the kiosk. Authorizing parties (or other entities) use various methods, protocols, and standards to enroll passengers or members into digital identity programs. Government entities, such as the TSA, have a vested interest in the security and quality of enrollment of identity data into a digital identity, because the quality of enrollments has a potential impact on security effectiveness, e.g., at checkpoints.

In another embodiment, the MIC generator 325 facilitates verification of the user's identity attributes against official records available to the DMV and/or physically presented by the user. Facilitated verification can be attended by an agent in person, or unattended and self-performed by the user at a kiosk or other automated system. In an embodiment, such facilitated verification involves the use of a system such as a kiosk or electronic device with audio/video playback and recording, visual scanning, or other telepresence capabilities, which the user accesses to interact remotely with an agent from the DMV or other APS that is to provision the MIC. Such a system can be located remote from the DMV or other APS facility at which the agent is located, and can be separate from the UMD. In an embodiment, the system to interact with the agent is the UMD that is to receive the MIC. Such system allows an agent at the DMV, through telepresence or other audio/visual interfaces of the system, to visually access, inspect, and verify information submitted as proof of identity (e.g., by scanning or photographing a birth certificate or the like). In another embodiment, such facilitated verification involves the user accessing a remote kiosk or smartphone app to virtually interact with an agent that facilitates the identity verification, or to interact with a self-guided verification user interface, such as a website or smartphone app. Generated MICs 350 are stored at the memory 320 of the APS 300 and available for provisioning onto the UMD 200 of the user. In an embodiment, a given APS 300 provisions multiple different MICs 350 onto the UMD 200, e.g., at APSs 300 that provide mDLs and employment IDs. Different types of MICs are associated with corresponding different levels of assurance (such as multi-factor verification) needed to facilitate verification of the user's identity, whether in-person or remote, attended or unattended, or other aspects of the identity verification. Furthermore, in embodiments, a given MIC environment is associated with a corresponding trust framework, such as the healthcare field and a related set of rules pertinent to maintaining security of healthcare information. The level of assurance for a given MIC environment corresponds to the trust framework. Additionally, in an embodiment, communications with the MIC generator (and other aspects of the MIC environment including the APS, UMD, and RPS and their various modules/logic) are facilitated and secured by cryptographic modules, e.g., as outlined in the National Institute of Standards and Technology (NIST) requirements and standards for cryptographic modules, the Federal Information Processing Standard (FIPS) publication 201 regarding Personal Identity Verification (PIV) requirements, and the like.

The verification system 330 of the APS 300 is configured to interact with an RPS 100, such as when handling requests received from an RPS 100 for MIC user information 40. In the illustrated embodiment, the verification system 330 uses a verification API 335 to handle interactions in a standardized computing format. In another embodiment, the verification system 330 is configured to interact with a UMD 200, e.g., to provision a MIC 210 onto the UMD 200 or receive RPS tokens 50 from the UMD 200. In yet another embodiment, the verification system 330 is configured to interact with other systems to verify or vet information. Such other systems include other APSs including government entities, trusted certificate holders, open ID providers, back ends, and the like. In an embodiment, the verification system 330 is configured to use and compare tokens for establishing trustworthiness as described above.

Generally, the APS verification system 330 verifies various aspects relating to MIC information. For example, the APS verification system 330 verifies whether a request to release user MIC information is legitimate, and if so, authorizes the release of such information. In an embodiment, the APS verification system 330 authorizes release of MIC user information 40 to the requesting RPS. In another embodiment, the APS verification system releases MIC user information to the UMD, e.g., when provisioning the MIC onto the UMD. In the illustrated example, the verification system uses a verification application programming interface (API) to communicate with other systems requesting verification and/or MIC information, including RPSs and/or UMDs. In embodiments, the verification system 330 of the APS 300 is configured to communicate with other systems, such as other APSs including government entities, trusted certificate holders, open ID providers, back ends, and the like. The APS verification system enables such communications to be secure, ensuring the integrity of such communications.

The memory 320 is associated with a database 340 of MICs. A given MIC 350 includes biographic information (BGI) 355 and Biometric Information (BMI) 360, which can be selectively requested and provided, e.g., as MIC user information 40, when the MIC 350 is provisioned onto a UMD. The MIC 350 also can include other information, such as privileges pertaining to the user.

The MIC 350 generally is structured to securely and discretely store various fields comprising the BGI 355, BMI 360, or other information. For example, the BGI 355 includes first name, last name, date of birth, sex, address, identifier number, organ donor status, and the like. In an example, the BMI 360 includes a digital photograph, a digital image representing a QR code containing the BGI 355, a digital fingerprint representation, a digital retina representation, and the like. The other information includes privileges for accessing a controlled area, operating a vehicle, and the like.

The structure of the MIC 350 enables the other information to be added, such as when provisioning the MIC 350 from the APS 300 to a UMD 200, or after provisioning the MIC 350 to the UMD 200, such as when the user enters information into the MIC 350 via the UMD 200. Information on the MIC 350 is compartmentalized and independently accessible.

Figure 4:
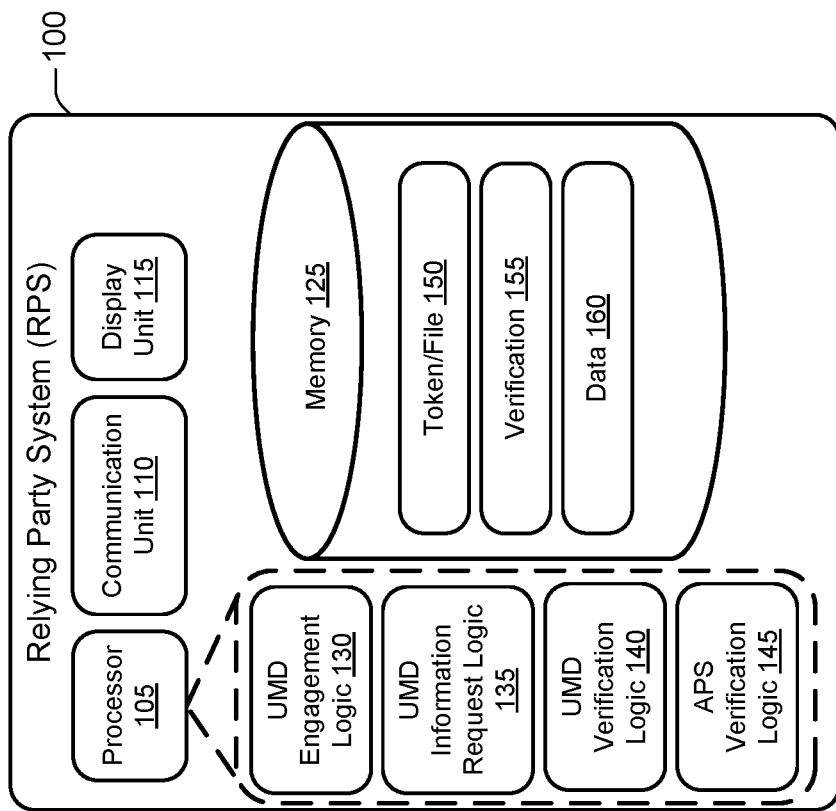
FIG. 4 illustrates a Relying Party System (RPS) according to an embodiment.

FIG. 4 illustrates an RPS 100 according to an embodiment. The RPS 100 includes a processor 105, communication unit 110, display unit 115, and memory 125. The processor 105 is associated with logic or modules to process information, including UMD engagement logic 130, UMD information request logic 135, UMD verification logic 140, and APS verification logic 145. Embodiments of the RPS 100 also can include hardware to collect information to perform a liveness check of the user, such as a camera, fingerprint reader, retina reader, and the like.

The UMD engagement logic 130 is configured to enable the RPS 100 to establish a secure local connection with the user's UMD 200 as explained above, e.g., based on QR codes or other techniques to establish secure local connections.

The UMD information request logic 135 is configured to enable the RPS 100 to structure a request for consent from the UMD 200 and transmit that request to the UMD 200 via a secure local connection. The request for consent includes a request for the types of user information which the relying party is requesting by way of the RPS 100. For example, the request for consent includes a request for the user's date of birth.

The UMD verification logic 140 is configured to enable the RPS 100 to verify whether user information received from the UMD 200 is valid, as set forth above regarding online and offline transactions.

The APS verification logic 145 is configured to enable the RPS 100 to verify the MIC user information 40 received from the APS 300. Similar to the online and offline approaches described above, the RPS 100 can access an electronic certificate authorized by the APS 300, whether stored locally or remotely, to digitally verify information received from the APS 300 that is digitally signed by the certificate used by the APS 300.

The memory 125 is associated with a token/file 150, a verification 155, and data 160. The RPS 100 makes use of tokens as set forth above, for trust and verification. The data 160 represents the received MIC user information 40.

Figure 5:
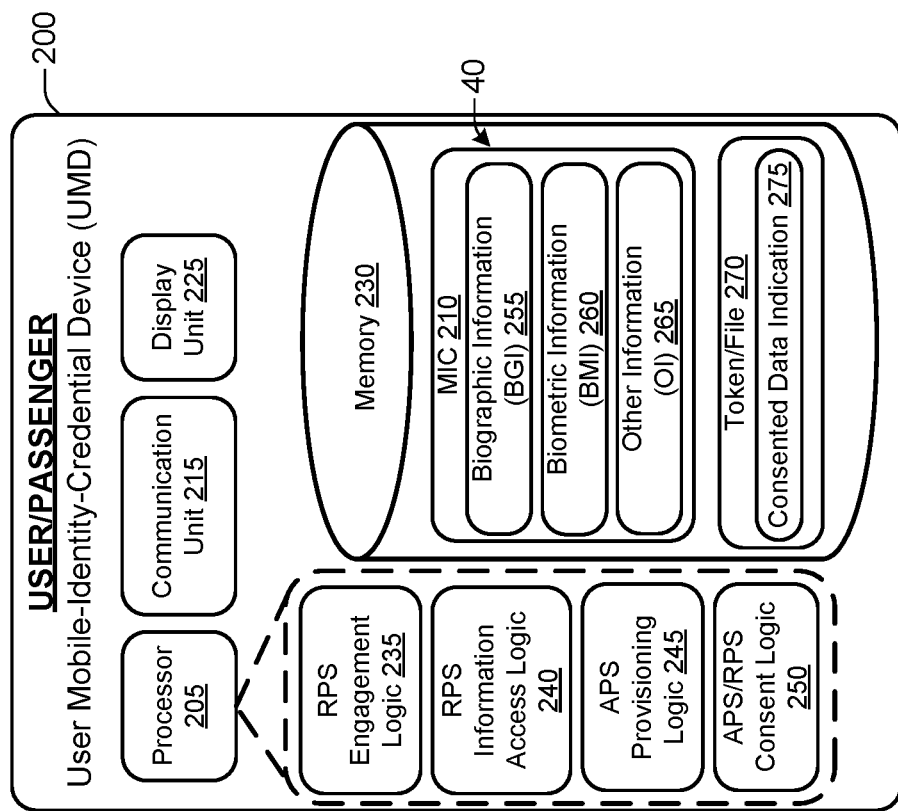
FIG. 5 illustrates a UMD according to an embodiment.

FIG. 5 illustrates a UMD 200 according to an embodiment. The UMD 200 includes a processor 205, communication unit 215, display unit 225, and memory 230. The processor 205 is associated with logic or modules to process information, including RPS engagement logic 235, RPS information access logic 240, APS provisioning logic 245, and APS/RPS consent logic 250.

In an alternate embodiment, the UMD 200 includes removable memory 230, such as a Universal Serial Bus (USB) flash memory unit or micro Secure Digital (SD) flash memory card. In such embodiments, the memory 230 of the UMD 200, which contains a provisioned MIC 210, is separable from the UMD 200 and/or combinable with a different UMD 200. In another embodiment, a memory itself serves as the UMD 200. In such embodiments, a user carries a portable memory UMD 200 containing the user's MIC 210 and/or user consent token/files 270. Such a portable memory UMD 200, in embodiments, is a portable USB flash drive. To conduct a transaction or otherwise provide identification, the user inserts the portable memory into an RPS 100, which interprets the insertion as proximal consent to read the MIC user information 40 (whether directly from the portable memory 230 to the RPS 100 in an offline mode, or indirectly by retrieving a user consent token from the portable memory and forwarding that token to an APS 300 from which the RPS 100 receives MIC user information 40). In yet another embodiment, the UMD 200 comprises a code, such as an electrically-readable code via magnet, RFID, and the like, or an optically readable code such as barcode, QR code, and the like. In such embodiments, the user conducts a transaction or otherwise provides identification by presenting the code to an RPS 100 including a reader compatible with the code's format. In an embodiment, the RPS 100 includes a keyboard that the user uses to manually type the code. In another embodiment, the RPS 100 includes a card reader to read the code contained in or on a card-format UMD, whether electronically, magnetically, or optically encoded on the card. The RPS reader can verify such identities by using those forms of identity to retrieve biometric information from the APS 300 and performing a comparison with the user to verify that the MIC 210 belongs to that user. In yet another embodiment, the UMD 200 is a personal identity verification (PIV) card.

The RPS engagement logic 235 is configured to enable the UMD 200 to establish the secure local connection with the RPS 100, as set forth above.

The RPS information access logic 240 is configured to enable the UMD 200 to allow the RPS 100 to access the MIC user information 40 associated with the MIC 210 (whether stored at the UMD 200 for offline mode access or stored at the APS 300 for online mode access). In the context of allowing access to MIC user information 40 stored on the UMD 200, passive access involves the UMD 200 enabling the RPS 100 to read data from the UMD 200. Active access involves the UMD 200 transmitting data to the RPS 100. Allowing access furthermore includes the UMD 200 authorizing release of MIC user information 40 from the APS 300 to the RPS 100, which similarly involves passive or active access between the RPS 100 and the APS 300. The RPS information access logic 240 is responsive to the UMD information request logic 135, as set forth above.

The APS provisioning logic 245 is configured to enable the UMD 200 to receive a MIC 210 from the APS 300 and store the received MIC 210 securely on the UMD 200. The APS provisioning logic 245 is responsive to the MIC generator 325 as set forth above. In an embodiment, the APS provisioning logic 245 communicates with the APS 300 to indicate readiness for provisioning the MIC 210 from the APS 300 onto the UMD 200. In embodiments, the APS provisioning logic 245 is configured to provision multiple MICs 210 onto the UMD 200. For example, the APS provisioning logic 245 provisions a first MIC 210 corresponding to an mDL, and a second MIC 210 corresponding to a crew member employment ID. The UMD 200 stores the MIC 210 in the memory 230 as illustrated, including the various information of the MIC 210 such as the BGI 255, BMI 260, and OI 265.

The APS/RPS consent logic 250 is configured to enable the UMD 200 to receive requests for the consent and release of MIC user information 40. The APS/RPS consent logic 250 is configured to generate, responsive to received requests, corresponding compartmentalized and/or discrete prompts for the user's consent to selectively indicate approval to release such MIC user information 40. In an example, the APS/RPS consent logic 250 is configured to interact with the UMD information request logic 135, as set forth above. In an embodiment, the APS/RPS consent logic 250 receives the user's selective consent and sends the consent to the APS 300 whereby the APS 300 acts in accordance with the consent. In another embodiment, the APS/RPS consent logic 250 receives the user's selective consent and directs the UMD 200 to selectively release the MIC user information 40 in accordance with the consent.

The memory 230 is associated with at least one MIC 210 and a Token/File 270. The MIC 210 includes MIC user information 40 such as biographic information (BGI) 255, Biometric Information (BMI) 260, and Other Information (OI) 265 such as privileges. The Token/File 270 includes a consented data indication 275. In an offline embodiment, the APS/RPS consent logic 250 obtains consent and transmits the requested MIC user information 40 including BGI 255, BMI 260, and/or OI 265 (e.g., using a secure communication link and a verification protocol to digitally sign the requested information) from the UMD 200 to the RPS 100. In an online embodiment, the APS/RPS consent logic 250 obtains consent via the token/file 270 (including a consented data indication 275) as described above. In embodiments, the RPS uses tokens to engage two APSs, or uses two separate public keys to authenticate data from two different issuing authorities.

Figure 6:
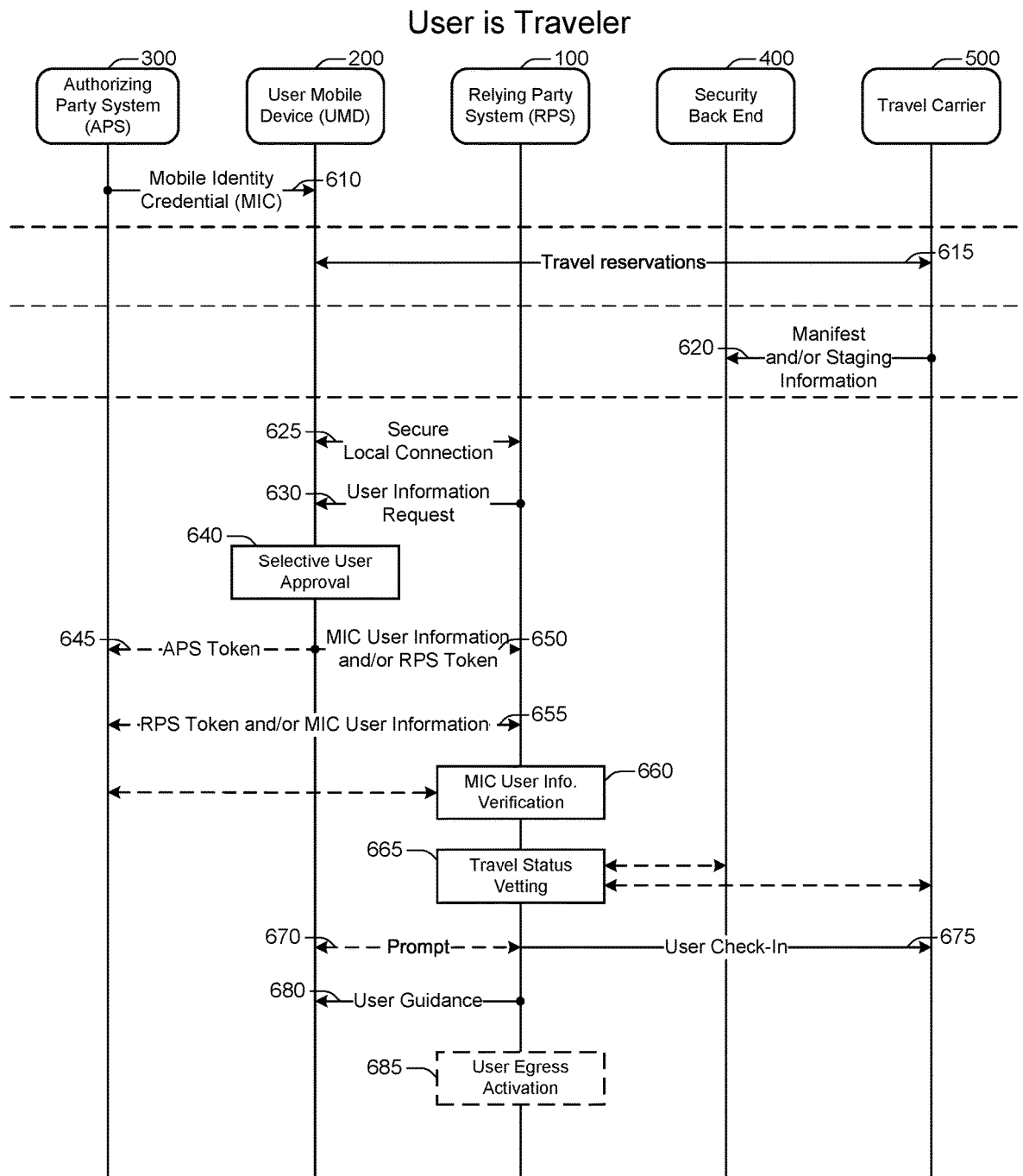
FIG. 6 illustrates travel status vetting of a traveler using a MIC according to an embodiment.

FIG. 6 illustrates travel status vetting of a traveler using a MIC according to an embodiment, based on communications between an APS 300, UMD 200, RPS 100, security back end 400, and travel carrier 500. Initially, the APS 300 provisions 610 a MIC onto the UMD 200, as described above.

The user then books 615 travel reservations with a travel carrier 500 (or third-party aggregator) as explained above, via the MIC as provisioned on the UMD 200.

The travel carrier 500 provides 620 manifest information and/or staging information to a security back end 400. In an embodiment, the security back end 400 is a system operated by a governmental agency, such as the TSA. In another embodiment, the security back end 400 is a system operated by a private agency that is authorized by the TSA, such as a registered traveler program or an employee/crew member ID verifying program. The travel carrier 500 passes some or all of the travel reservation user information to the security back end 400. In an embodiment, the security back end 400 is configured to request, from the travel carrier 500 (or a third-party registered traveler program), verified MIC user information 40. Such verified MIC user information 40 could have already been obtained via a MIC transaction between the UMD 200 and the travel carrier 500 when the user securely booked travel reservations. In an embodiment, such verified MIC user information 40 includes biographic information 255, such as user name and social security number, along with biometric information 260, such as a verified photograph of the user. The security back end 400 may use verified user photographs or other MIC user information 40 to stage a gallery of users expected for travel in a given timeframe, as explained above.

Upon arriving at a security checkpoint kiosk (serving as an RPS 100 in the MIC environment), the user, via the UMD 200, initiates or establishes 625 a secure local connection with the RPS 100 as explained above.

Following the establishment of the secure location connection, the RPS 100 sends 630 a MIC user information request (also referred to as a credential request) to the UMD 200. The user information request reflects only those credentials needed by the RPS 100. For example, when arriving at the security checkpoint RPS 100, the RPS 100 would request the user's photograph, name, age, and social security number. Such requested information is 1) used to verify the identity of the user, and 2) used to compare the user's identity against the manifest or staging information. In an embodiment, such manifest or staging information corresponds to comparing against a valid travel reservation.

In another embodiment, such manifest or staging information corresponds to verifying against information of a user having a legitimate reason to visit the travel site, such as a crew member, employee, or the like. The security checkpoint kiosk RPS 100 uses such information to vet those users passing through the security checkpoint kiosk RPS 100, even if they are not necessarily associated with a travel reservation.

In embodiments, the RPS 100 also performs a liveness check as described above, to verify that the user who is in possession of the UMD 200 corresponds to the user's MIC provisioned on the UMD 200.

Upon receiving the credential request, the UMD 200 determines whether user approval is available. In an embodiment, the UMD 200 identifies a pre-configured setting corresponding to the user information request 630. For example, the user configures the UMD 200 to automatically approve requests originating from a TSA security checkpoint kiosk RPS 100. Such auto-approval enhances the passenger experience by streamlining the security checkpoint procedure, particularly beneficial for frequent fliers or users whose release responses do not vary between repeat visits to a given RPS. In another embodiment, the UMD 200 is configurable to enable the UMD to "always trust" and consent to requests from a given type of RPS, independent of the specifically requested types of consent. For example, the UMD 200 is configurable to always trust an RPS operated by or otherwise provided by the TSA and/or other government entity. In yet another embodiment, the UMD 200 prompts 640 the user for selective approval to release MIC information corresponding to the credential request. In such examples, the credential request corresponds to a request for the user's information sufficient for the security checkpoint kiosk RPS 100 to verify identity information. Accordingly, the UMD 200 displays a prompt requesting the user's permission to release, to the RPS 100, the user's photograph, name, age, and social security number information as indicated in the MIC, from the UMD 200 to the RPS 100. In yet another embodiment, the UMD 200 enables the user to designate whether to store the user's selective responses to such user information request prompts, whether from that specific requestor of the user information (e.g., the security checkpoint kiosk RPS 100), or other requestors. For example, the user can selectively approve release of the user's photograph, name, and age, while withholding release of social security number, to a given request from the security checkpoint kiosk RPS 100. The user also can provide approval to remember such response settings, and submit them in response to future requests from security checkpoint kiosk RPSs 100.

In embodiments, the MIC user information is released according to online or offline embodiments, as explained above. More specifically, in an online embodiment, upon granting consent at the UMD 200, the UMD 200 proceeds to release 645, 650 tokens to the RPS 100 and APS 300, corresponding to allowing the APS 300 to release 655 such MIC user information. In this online mode, the RPS 100 does not need to maintain a secure local connection with the UMD 200 during payload delivery 655. In an embodiment, payload delivery 655 involves transfer of relatively larger files. Accordingly, the user experience is improved by avoiding battery drain and inconvenience associated with waiting for payload transfers directly from the UMD 200. Such payload transfers are handled online between the APS 300 and RPS 100, while still being selectively controlled by the user as to what specific user credential MIC information is released. In contrast to the online mode, the offline mode embodiment enables the UMD 200 to release 650 such MIC information directly from the UMD 200 to the RPS 100, e.g., through the use of tokens as explained above.

More specifically, in the online embodiment, the UMD 200 delivers 650 an RPS token to the RPS and delivers 645 a matching APS token to the APS 300. Such token deliveries comprise a relatively small digital footprint, enabling the deliveries to occur relatively quickly. The RPS 100 then transfers 655 the RPS token to the APS 300, and the APS 300 verifies that the APS token from the UMD 200 matches the RPS token from the RPS 100. Upon token verification, the APS 300 releases, to the RPS 100, that MIC user information which the user has consented to release (e.g., consent as indicated in the tokens). The APS 300 digitally signs and/or encrypts the MIC user information being released, allowing for verification 660 of the MIC user information by the RPS 100.

Upon receipt of the MIC user information (whether via online or offline mode), the RPS 100 verifies 660 the MIC user information via the signature using a digital certificate from the APS 300, and/or decrypts the payload using the public key of the APS 300.

Following user information verification, the security checkpoint kiosk RPS 100 proceeds to vet 665 the travel status of the user. As used herein, the phrase travel status includes status of users who are non-travelers (e.g., a travel status of non-traveler). For example, a non-traveling visitor obtains and uses a "gate pass" to: give assistance to an unaccompanied minor passing through a security checkpoint, visit businesses beyond the security checkpoint, and/or proceed to a place of employment beyond the security checkpoint. In such situations, the travel status vetting is performed by accessing the gate pass information at the security back end 400 and/or travel carrier 500 involved in granting the gate pass to the visitor. In other situations, the travel status vetting involves communicating with the security back end 400 and/or other entities involved in granting the user access beyond the security checkpoint. In an embodiment, the non-traveling user information, available at the security back end 400 and/or other entities granting non-traveling access, is derived from MIC user information through which the user previously obtained the gate pass, enabling perfect matching and staging options (see further details below) at the time of vetting as applied to the user presenting at the security checkpoint kiosk RPS 100.

After verifying 660 and vetting 665 the user, the RPS 100 directs 670 the UMD 200 to generate a dialog to remind the user to check in 675 with the travel carrier 500, if the user has not already checked in. In another embodiment, the RPS 100 generates a notification to check in the user and transmits 675 the notification to the travel carrier 500 on behalf of the user. In another embodiment, the RPS 100 requests consent from the user to check in the user with the travel carrier 500. Thus, there is no need for the user to separately check in with the travel carrier 500, enhancing the efficiency and enjoyment of the user's overall travel experience. Furthermore, such notification 670 is transmitted after the user has completed checkpoint identity verification and vetting. Accordingly, the travel carrier 500 enjoys increased accuracy of pre-flight check-in because the user has already completed at least a portion of the security checkpoint experience and has eliminated that corresponding portion of uncertainty associated with potential security checkpoint delays.

Figure 7:
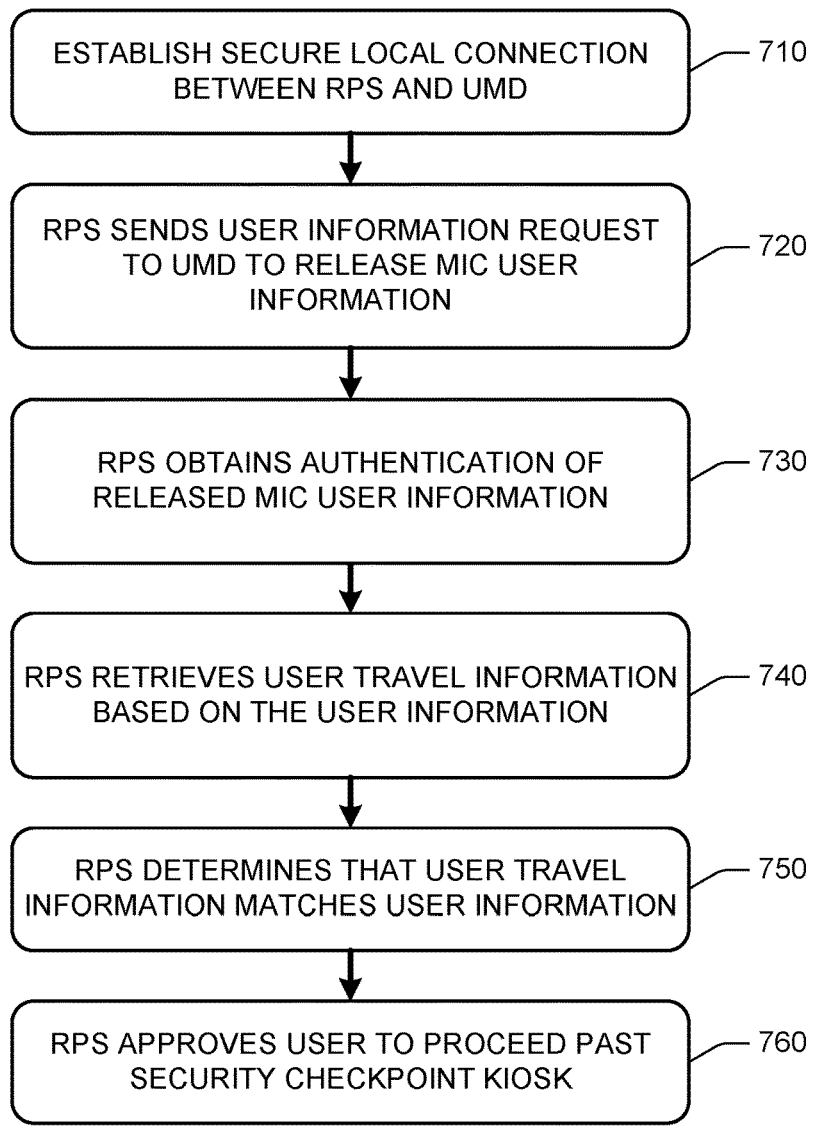
FIG. 7 illustrates a method of travel status vetting according to an embodiment.

Embodiments enable the RPS 100 to provide 680 customized guidance to assist the user in proceeding past the security checkpoint kiosk RPS 100. In an embodiment, the pre-staged user information is used for identity verification. That verification is then used to facilitate manual or automated decisions that are relevant to user access or directing a user to the next step or place in the security process, such as a registered traveler program line FIG. 7 illustrates a method 700 of travel status vetting according to an embodiment. In block 710, the RPS and UMD establish a secure local connection, as described above.

In block 720, the RPS sends a user information request to the UMD, requesting user consent to release user information corresponding to a MIC. For example, a security checkpoint kiosk requests release of the user's name, date of birth, and photograph.

In an embodiment, to obtain user consent, the UMD displays a prompt to the user including information identifying the RPS, along with the user information that the RPS is requesting. The user is prompted to independently and discretely approve types of information requests.

The UMD uses the user consent to release the user information to the RPS, as explained above in the context of offline and online modes.

In block 730, the RPS obtains verification of the MIC user information received in response to the user information request, as explained above.

In block 740, the RPS retrieves user travel information from a travel carrier based on the user information obtained through the MIC. Such user travel information can include a travel manifest for passengers flying that day, flight reservation information stored at the travel carrier based on booked travel reservations, carrier profile information submitted by registered carrier users, and the like. As described above, the MIC environment provides a mechanism to ensure that the user information, presented by the user at the security checkpoint kiosk interaction, perfectly matches the user information that was initially submitted to the travel carrier when the user booked travel reservations. More specifically, the biographic user information, which would otherwise be entered by hand and therefore prone to error, is fully accurate and error free. Thus, the MIC environment prevents the possibility for mis-entered information, such as when a user books a travel reservation under a nickname or enters a typo in their name or other information as submitted to the travel carrier when booking travel reservations.

In block 750, the RPS determines that the user travel information matches the user information. Such positive matching is made more efficient by using the MIC environment, avoiding the potential for mismatches or other data entry issues. Furthermore, the transactions are made more efficient by virtue of verifying information electronically, without a need for an agent to visually verify physical travel documents or physical forms of ID.

In block 760, the security checkpoint kiosk RPS approves the user to proceed past the security checkpoint kiosk. For example, upon successfully verifying the user's identity, the RPS provides helpful guidance to the user instructing the user to proceed past the kiosk, e.g., to a dedicated line for members of a registered traveler program.

Figure 8:
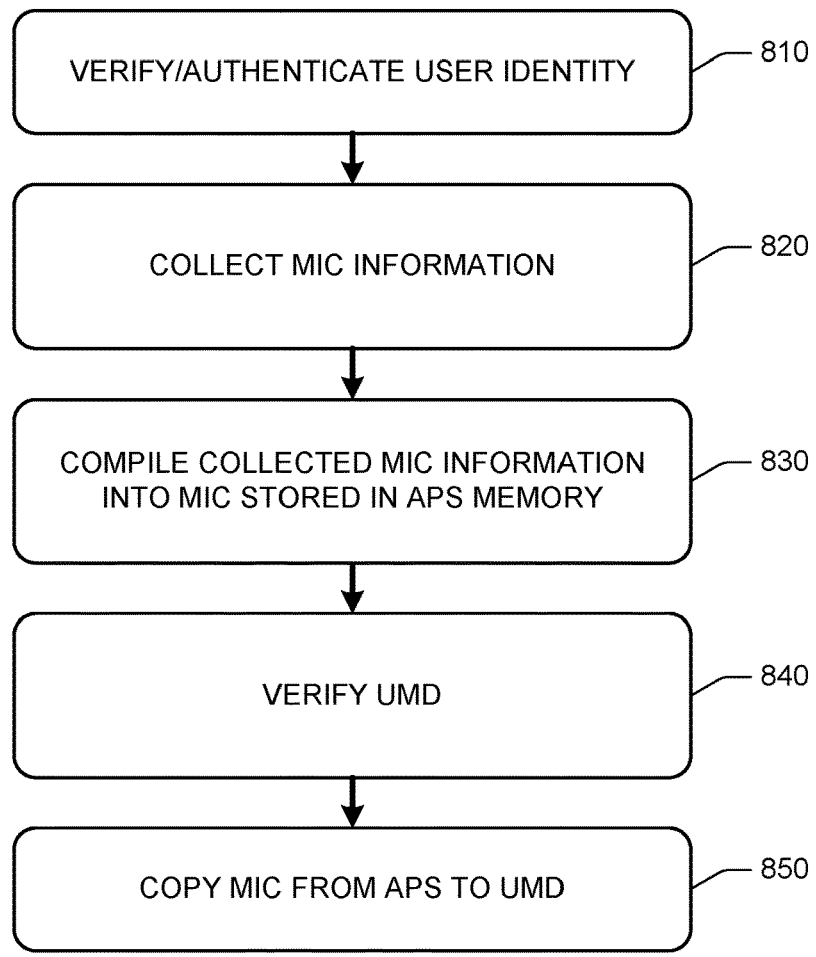
FIG. 8 illustrates a method of generating a MIC as performed by the APS according to an embodiment.

FIG. 8 illustrates a method 800 of generating a MIC as performed by the APS according to an embodiment. Such method is performed by the example MIC generator illustrated in FIG. 3. Generally, embodiments of the MIC generator handle creation and/or provisioning of the MIC, and support in-person and remote provisioning of the MIC onto the UMD.

In block 810, the MIC generator obtains proof of identity for the user whose MIC is to be generated. Such proof is provided via collected and verified information about the user, such as a birth certificate, social security card, proof of residency, or other identity-related documents for proving or otherwise verifying identity, as explained above.

In block 820, the MIC generator collects MIC information related to the MIC that is to be generated. For example, the MIC generator collects, from the APS, verified user biographic information such as name and address, and biometric information such as photograph and fingerprints, which will be part of the MIC. The APS provides such biometric information to the MIC generator as needed, e.g., by collecting the user's fingerprints or iris scan, taking the user's photograph, or the like. Additionally, the MIC generator collects from the APS other information, such as driving privileges, that relate to the MIC that is to be provisioned onto the UMD.

In block 830, the MIC generator compiles the collected MIC information into a MIC that is stored in the memory of the APS. In an embodiment, the MIC is one of multiple MICs comprising a database of MICs stored in the memory of the APS. In embodiments, the stored MIC is available for provisioning onto the UMD and is available to satisfy verification requests from RPS requesting MIC information from the APS according to an online mode.

In block 840, the MIC generator verifies suitability of the UMD on which the MIC will be provisioned. In an embodiment, the APS performs device identification and verification by interfacing with the UMD to retrieve device-specific identity information from the UMD, such as the manufacturer and model of the user's UMD. The APS checks whether the UMD manufacturer and model information are on a list of acceptable UMDs. In embodiments, such interfacing is carried out via secure wired or wireless local connections between the APS and the UMD. In another embodiment, the MIC generator of the APS interfaces with the UMD to identify and verify the UMD in a secure fashion facilitated by an electronically readable and cryptographically protected chip embedded in the UMD. In another embodiment, the APS performs a multi-factor verification of the UMD to identify and verify the UMD. Verifying or identifying the UMD enables the MIC generator to verify that the UMD is compatible with and approved for use with the MIC environment, including provisioning a MIC onto the UMD.

In block 850, the MIC generator copies the MIC from APS memory to the UMD. In an embodiment, the MIC is copied via the secure wired or wireless local connection between the APS and the UMD used to verify the UMD. In another embodiment, the MIC is remotely provisioned onto the UMD over a remote secure connection, such as via the internet. Such connections and/or transferred data are secured by encryption or other technological protections as explained above. The MIC generator can read the copied MIC from the UMD, and compare the UMD copy of the MIC to the APS copy of the MIC, to verify successful data transfer.

Figure 9:
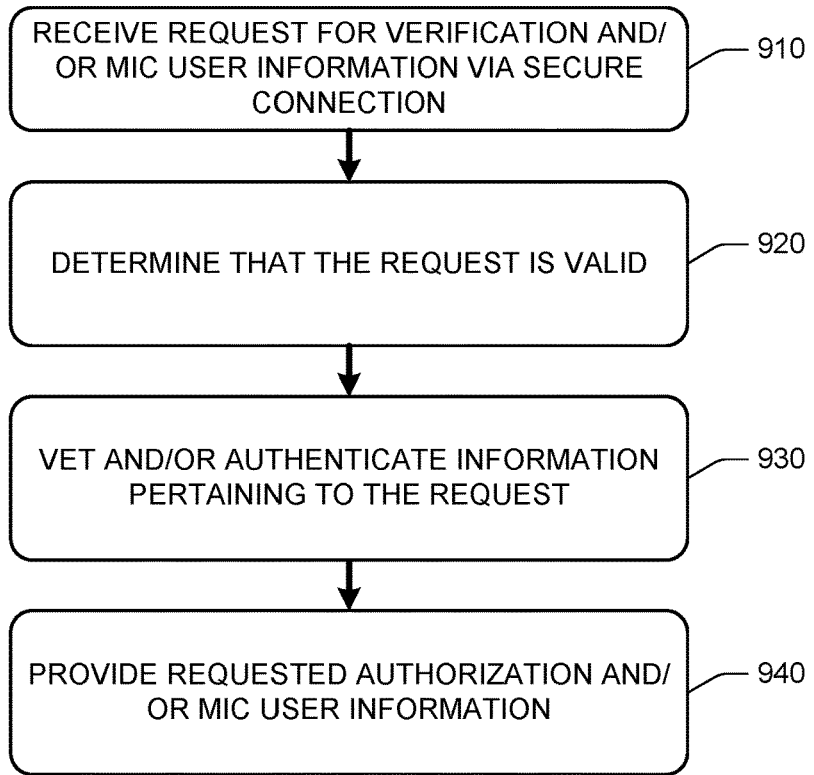
FIG. 9 illustrates a method of verification as performed by the APS according to an embodiment.

FIG. 9 illustrates a method 900 of verification as performed by the APS according to an embodiment. Such method is performed by the example verification system illustrated in FIG. 3 as explained above.

In block 910, the verification system receives a request for verification or MIC user information via a secure connection. The APS establishes secure connections consistent with the various example secure connections as provided throughout the disclosure in the context of other examples presented herein. In an embodiment, the verification system establishes the secure connection in response to a request.

In block 920, the verification system determines that the request is valid. In an embodiment, the request is for the APS to verify a transaction, and the APS verifies the transaction by verifying one or more elements used to carry out the transaction. For example, the APS verifies that an APS certificate used in a transaction is valid, or verifies information using public key cryptography. Such verification involves verifying the connections, data transfers, and/or data itself.

In block 930, the verification system verifies the information pertaining to the request. In an example, the verification system communicates with a travel carrier to determine whether the requested information pertains to a traveler who is scheduled to travel that day. In another example, the verification system communicates with other servers, APSs (e.g., a governmental source such as a DMV), back ends such as travel carrier reservation systems, or other systems to cross-reference received information against other authoritative sources or copies of MIC user information locally stored at the APS.

In block 940, the verification system provides the requested authorization or MIC user information. In an embodiment, the verification system provides affirmative confirmation, e.g., a digitally signed token, that indicates that the requested authorization is granted. In another embodiment, the verification system provides affirmative confirmation, e.g., a digitally signed token, that the MIC user information pertaining to the request is valid.

Figure 10:
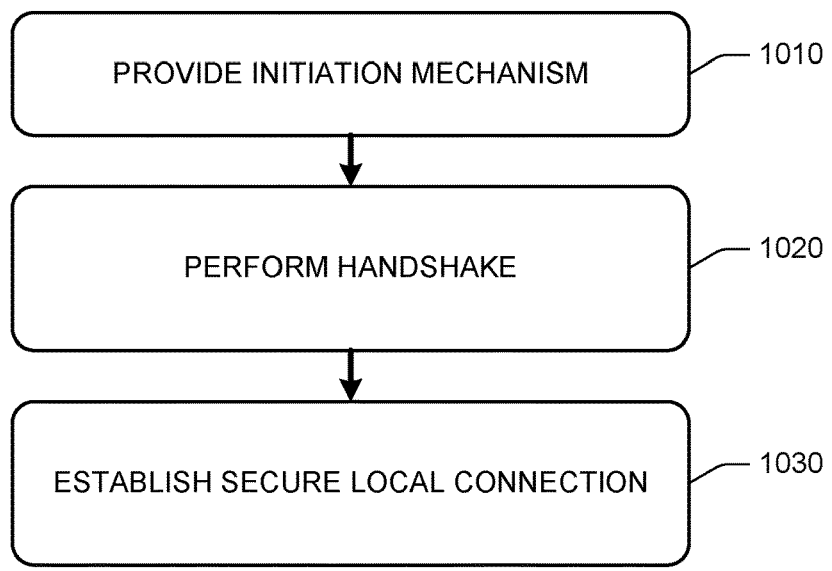
FIG. 10 illustrates a method of UMD engagement as performed by the RPS according to an embodiment.

FIG. 10 illustrates a method 1000 of UMD engagement as performed by the RPS according to an embodiment. Such method is performed by the example UMD engagement logic illustrated in FIG. 4. Generally, the UMD engagement logic establishes a secure local connection between the RPS and the UMD, which is used for secure communications and data transfers between the RPS and the UMD.

In block 1010, the RPS provides an initiation mechanism. The initiation mechanism provided by the RPS enables a UMD to initiate a connection with the RPS, such as via a QR code or other technique as explained above.

In block 1020, the RPS and UMD perform a handshake. In an example, the handshake is performed in response to the initiation of the transaction described above with respect to block 1010. The secure handshake is performed, e.g., via a cryptographic key exchange such as a Diffie-Hellman key exchange, and enables the RPS to establish the secure connection with the UMD.

In block 1030, the RPS and UMD establish a secure local connection, as explained above. The secure local connection enables the RPS and UMD to exchange information securely. The secure local connection enables exchange of requests/responses, tokens, and MIC information.

Figure 11:
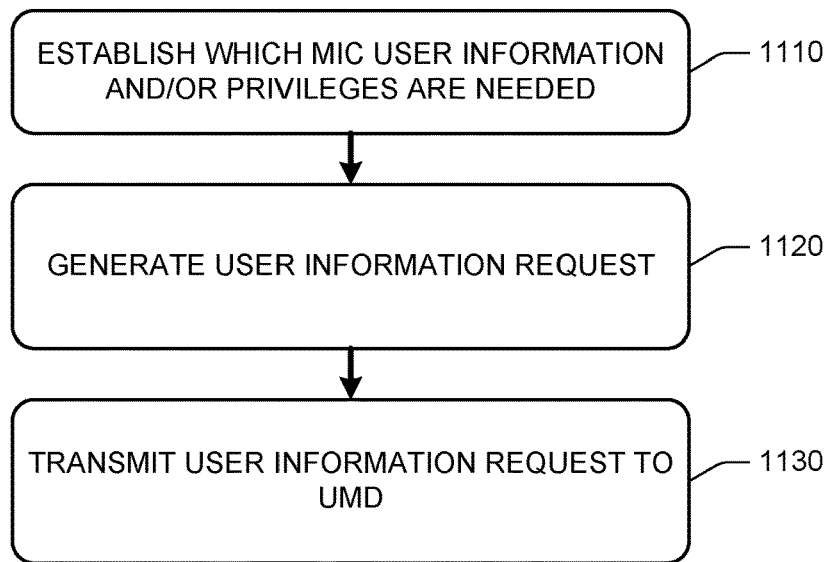
FIG. 11 illustrates a method of UMD information request as performed by the RPS according to an embodiment.

FIG. 11 illustrates a method 1100 of UMD information request as performed by the RPS according to an embodiment. Such method is performed by the example UMD information request logic illustrated in FIG. 4. Generally, the RPS needs information from the UMD, which the RPS uses for a given transaction. In an example, the RPS, serving as a security checkpoint kiosk, needs identity information from the user's UMD, in order to verify the identity of the user, and also vet the user's travel status.

In block 1110, the RPS establishes which MIC user information or privileges the RPS needs from the UMD. In a security checkpoint kiosk RPS example, the RPS needs the user's photograph, name, age, and social security number, as explained above.

In block 1120, the RPS generates the user information request. In an example, the RPS constructs the request as a data structure, such as a token or file, that is stored in the memory of the RPS. The RPS constructs the user information request in a manner that the UMD is able to act on, e.g., to identify which specific aspects of the MIC user information (or other information such as privileges) are needed by the RPS. The user information request is also structured to enable the UMD to selectively consent to release of one or more of the particular compartmentalized portions of the user information request. For example, the UMD approves release of a name request contained in the user information request, while not approving release of a social security request contained in the user information request.

In block 1130, the RPS transmits the user information request to the UMD. In an embodiment, the RPS and UMD exchange such information via the secure local connection established as set forth above.

Figure 12:
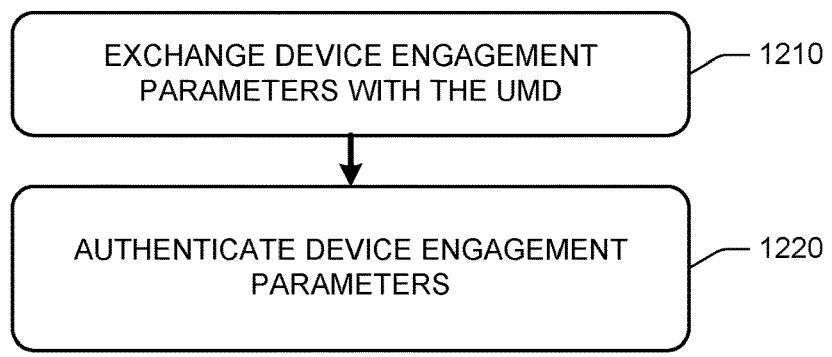
FIG. 12 illustrates a method of UMD verification as performed by the RPS according to an embodiment.

FIG. 12 illustrates a method 1200 of UMD verification as performed by the RPS according to an embodiment. Such method is performed by the example UMD verification logic illustrated in FIG. 4. Generally, the RPS verifies that it is communicating with a legitimate UMD, as part of ensuring that information to/from the UMD is trustworthy.

In block 1210, the RPS exchanges device engagement parameters with the UMD. Such exchange is similar to the exchanges as set forth above with respect to FIG. 10 regarding establishing the secure local connection. Furthermore, in embodiments, the exchange involves parameters that enable the RPS to verify that the UMD is part of an acceptable MIC environment, such as being capable of storing a provisioned MIC on the UMD. For example, the RPS requests a token or digitally signed information from the UMD, that indicates that the UMD is trusted by the APS with which the RPS conducts transactions.

In block 1220, the RPS verifies the device engagement parameters. For example, the RPS confirms that the token or information received from the UMD is authorized by the APS, e.g., by examining the digital signature of the token or information, or by decrypting the token or information using a public key of the APS.

Figure 13:
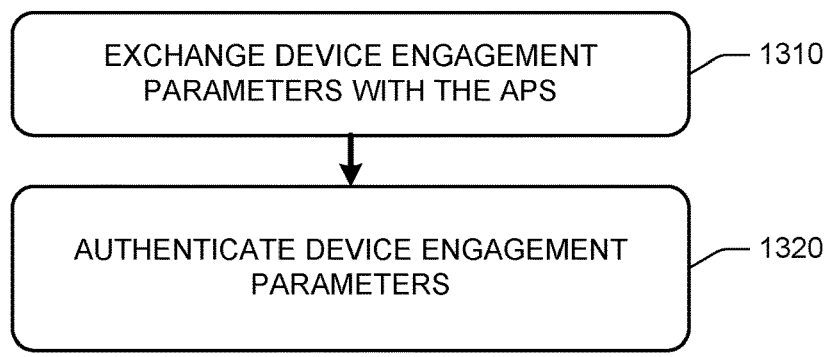
FIG. 13 illustrates a method of APS verification as performed by the RPS according to an embodiment.

FIG. 13 illustrates a method 1300 of APS verification as performed by the RPS according to an embodiment. Such method is performed by the example APS verification logic illustrated in FIG. 4. Generally, the RPS verifies that it is communicating with a legitimate APS, as part of ensuring that information to or from the APS is trustworthy.

In block 1310, the RPS exchanges device engagement parameters with the APS. Such exchange is similar to the exchanges as set forth above with respect to FIG. 10 regarding establishing the secure local connection.

In block 1320, the RPS verifies the device engagement parameters. For example, the RPS confirms that the token/information received from the APS matches publicly available or trustworthy APS certificates, using encryption or other technological protections as described above.

Figure 14:
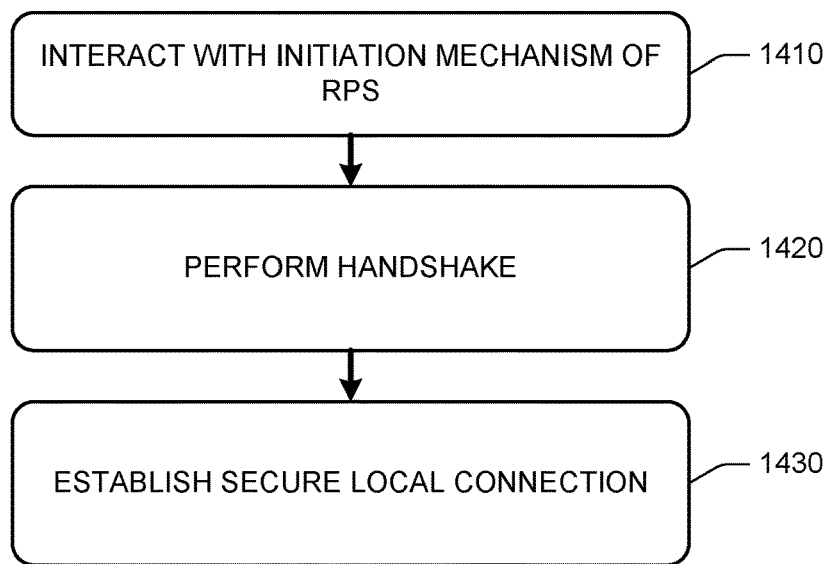
FIG. 14 illustrates a method of RPS engagement as performed by the UMD according to an embodiment.

FIG. 14 illustrates a method of RPS engagement as performed by the UMD according to an embodiment. Such method is performed by the example RPS engagement logic illustrated in FIG. 5. Generally, the RPS engagement logic corresponds to the UMD engagement logic as set forth above with respect to FIG. 10, but from the perspective of the UMD instead of the RPS. The RPS engagement logic generally establishes a secure local connection between the UMD and the RPS, which is used for secure communications and data transfers between the UMD and the RPS.

In block 1410, the UMD interacts with an initiation mechanism of the RPS. The initiation mechanism provided by the RPS enables the UMD to initiate a connection with the RPS. In an embodiment, the UMD initiates a local connection session using a QR code or other technology, as explained above.

In block 1420, the UMD and RPS perform a handshake. In an example, the handshake is performed in response to the initiation of the transaction described above with respect to block 1410. The secure handshake can be performed as described above.

In block 1430, the UMD and RPS establish a secure local connection. The secure local connection enables the UMD and RPS to exchange information securely, and can be established as explained above. The secure local connection enables exchange of requests/responses, tokens, and MIC information.

Figure 15:
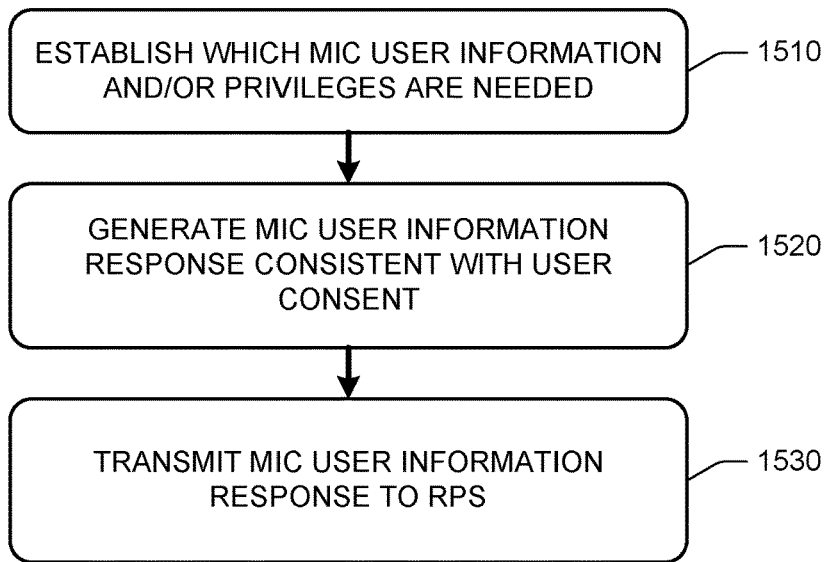
FIG. 15 illustrates a method of RPS information access as performed by the UMD according to an embodiment.

FIG. 15 illustrates a method of RPS information access as performed by the UMD according to an embodiment. Such method is performed by the example RPS information access logic illustrated in FIG. 5. Generally, the RPS information access logic is responsive to the UMD information request logic as set forth above with respect to FIG. 11, but from the perspective of the UMD instead of the RPS. The UMD (e.g., in an offline mode) needs to provide MIC user information to the RPS (offline mode) or needs to provide a token granting the RPS access to such MIC user information online at an APS (online mode).

In block 1510, the UMD establishes which MIC user information or privileges the RPS needs from the UMD. In a security checkpoint kiosk RPS example, the UMD examines an information request from the RPS, to establish what the RPS needs.

In block 1520, the UMD generates the MIC user information response, which is potentially responsive to the user information request from the RPS (depending on user consent). In an embodiment, the UMD constructs the response as a data structure, such as a token or file, that is stored in the memory of the UMD.

In block 1530, the UMD transmits the user information response to the RPS. In an embodiment, the UMD and RPS exchange such information via the secure local connection established as set forth above.

Figure 16:
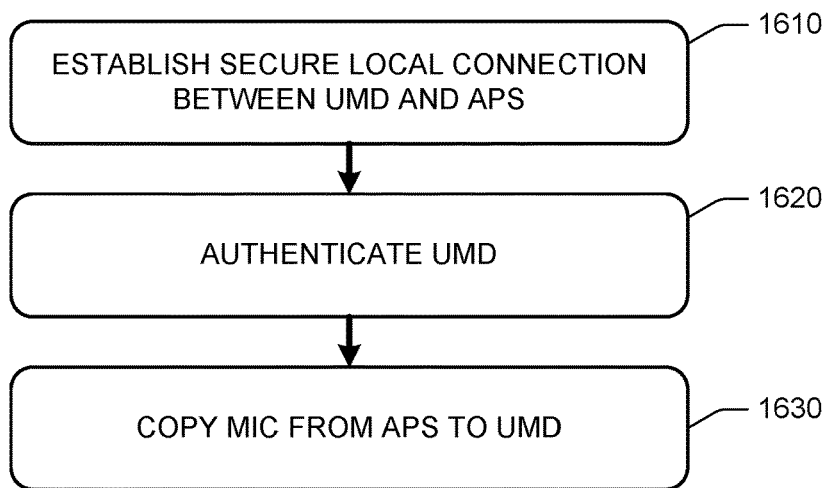
FIG. 16 illustrates a method of APS provisioning as performed by the UMD according to an embodiment.

FIG. 16 illustrates a method of APS provisioning as performed by the UMD according to an embodiment. Such method is performed by the example APS provisioning logic illustrated in FIG. 5. Generally, the APS provisioning logic is responsive to the MIC generator as set forth above with respect to FIG. 10, but from the perspective of the UMD instead of the APS. Embodiments of the APS provisioning logic handle receiving or provisioning of the MIC from the APS onto the UMD, and support in-person and remote provisioning of the MIC onto the UMD.

In block 1610, APS provisioning logic directs the UMD to establish a secure local connection with the APS, as explained above.

In block 1620, the APS provisioning logic directs the UMD to verify the APS that is to provision the MIC onto the UMD. In an embodiment, the APS provisioning logic of the UMD responds to the APS that is performing device identification and verification to the UMD, as explained above.

In block 1630, the APS provisioning logic directs the UMD to receive a copy of the MIC, copied by the APS from APS memory to secure or encrypted local memory of the UMD as explained above.

Figure 17:
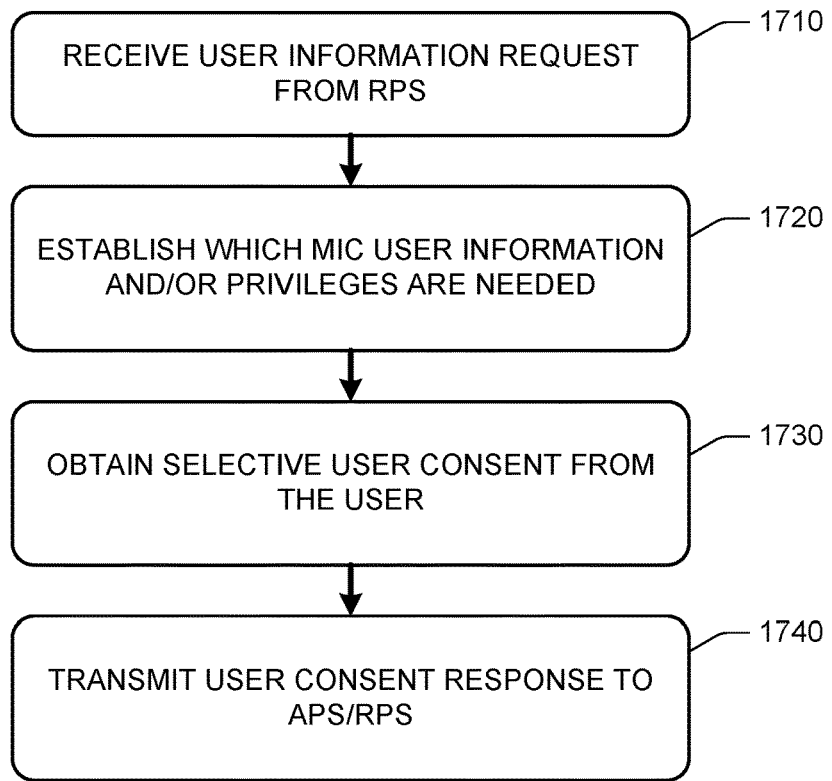
FIG. 17 illustrates a method of APS/RPS consent as performed by the UMD according to an embodiment.

FIG. 17 illustrates a method of APS/RPS consent as performed by the UMD according to an embodiment. Such method is performed by the example APS/RPS consent logic illustrated in FIG. 5. Generally, the APS/RPS consent logic corresponds to the UMD information request logic as set forth above with respect to FIG. 11, but from the perspective of the UMD instead of the RPS. The APS/RPS consent logic generally enables the user in possession of the UMD to selectively consent to release of MIC user information, whether requested directly from the UMD (offline mode), or whether granting access to the MIC user information as stored on and retrieved directly from the APS (online mode).

In block 1710, the UMD receives a user information request from the RPS. In an embodiment, the UMD receives the user information request from the RPS via the secure local connection established between the RPS and UMD as explained above.

In block 1720, the UMD establishes which MIC user information or privileges the RPS needs from the UMD. In an embodiment, the APS/RPS consent logic digests the received user information request from the RPS to extract and determine which particular fields, corresponding to particular compartmentalized MIC information, to which the user needs to selectively grant or withhold consent for release.

In block 1730, the APS/RPS consent logic directs the UMD to obtain selective user consent from the user. In embodiments, the APS/RPS consent logic is also referred to as a privacy dialog. In an embodiment, the UMD is a mobile device that has user interface logic that enables a user interface controller to provide a user interface. The APS/RPS consent logic directs the smartphone user interface to display a prompt that identifies the user information request and prompts for consent to portions of the user information request. For example, the APS/RPS consent logic directs the user interface to prompt "Consent to release date of birth to security checkpoint kiosk Yes/No?" The APS/RPS consent logic receives the user's response and continues to prompt for the remainder of additional needed MIC information. Accordingly, the APS/RPS consent logic collects the various selective responses to the various corresponding prompts for different aspects of consent, and packages such responses into a user consent response. In an embodiment, the user consent response serves as a user consent token, which the RPS passes to the APS to retrieve corresponding MIC user information (e.g., in an online mode). In another embodiment, the APS/RPS consent logic combines multiple requests into a single prompt, for example, where the multiple different types of consent are needed, or the transaction fails. In the security checkpoint kiosk example, the APS/RPS consent logic displays a single prompt asking the user to consent to release all specified MIC user information that is required by security in order to allow the user to pass the checkpoint. For example, the APS/RPS consent logic directs the UMD to display "Consent to release photograph, name, age, and social security number to security checkpoint kiosk Yes/No?" In other embodiments, the RPS specifies which types of consent prompts are combined. In an embodiment, the UMD displays such combination prompts, while allowing the user to maintain selective consent.

In block 1740, the APS/RPS consent logic directs the UMD to transmit the user consent response to the APS/RPS. In an embodiment, such information is transmitted via secure connections established as set forth above.

Figure 18:
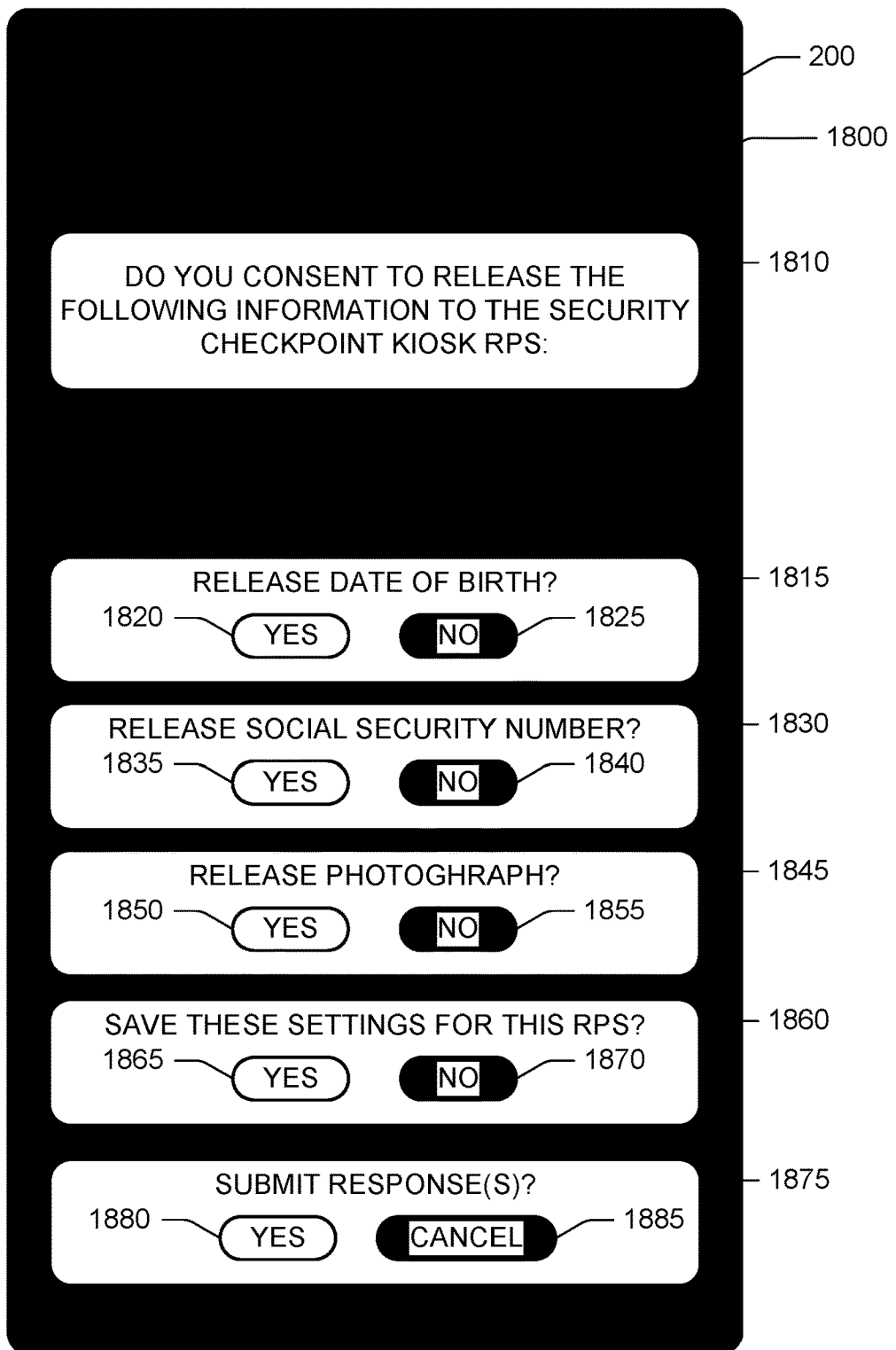
FIG. 18 illustrates a privacy dialog according to an embodiment.

FIG. 18 illustrates a privacy dialog 1800 according to an embodiment. The privacy dialog 1800 enables interaction between a user and the UMD 200, enabling the user to grant selective consent to release of MIC user information. In embodiments, the UMD 200 provides the privacy dialog 1800 via APS/RPS consent logic running on the UMD 200.

The privacy dialog 1800 includes an information prompt 1810, individual release prompts 1815, 1830, 1845, a save prompt 1860, and a submit prompt 1875. The various prompts enable the user to easily view which specific MIC information is requested by the RPS, and selectively grant consent to those prompts to which the user agrees, while selectively denying consent to those prompts to which the user disagrees. The release prompts include YES/NO radio buttons, which are illustrated in a default selection of NO to encourage a security-centric option that protects the user's MIC information from release by default. If the user agrees to release a given piece of MIC user information, the user selects the YES button in the release prompt corresponding to that MIC information. If the user prefers to save the settings for this interaction with this RPS, the user selects YES for the save prompt 1860. In another embodiment, the user is given the option whether to save the setting for individual prompts. In yet another embodiment, the user is initially given the option to establish default settings, such as whether to save the ability to always consent to requests from security checkpoint kiosk RPSs, always consent to government requests, and so on.

The multiple different prompts provide a readily-appreciated interface for the user to easily understand exactly which types of MIC user information the RPS is requesting be released by the UMD 200. Furthermore, the ability to selectively provide or withhold consent to different types of requests provides the user with a sense of control and feeling of safety, that only the particular, displayed, agreed-upon portion of the user's MIC information will be released.

When the various YES/NO radio buttons are configured to the user's satisfaction, the user interacts with the submit prompt 1875 to indicate that the user is ready to release the indicated selective MIC information. As illustrated, the user presses a YES button 1880 to submit the user's selective consent as indicated in the release prompts 1815, 1830, 1845, and whether to save the settings as indicated in the save prompt 1860. As set forth above, the UMD 200 then releases the user consent response (e.g., as a token) and/or the actual MIC user information stored on the UMD 200 (e.g., in an offline embodiment). If the user does not agree to submit responses, the user presses the cancel button 1885.

Figure 19:
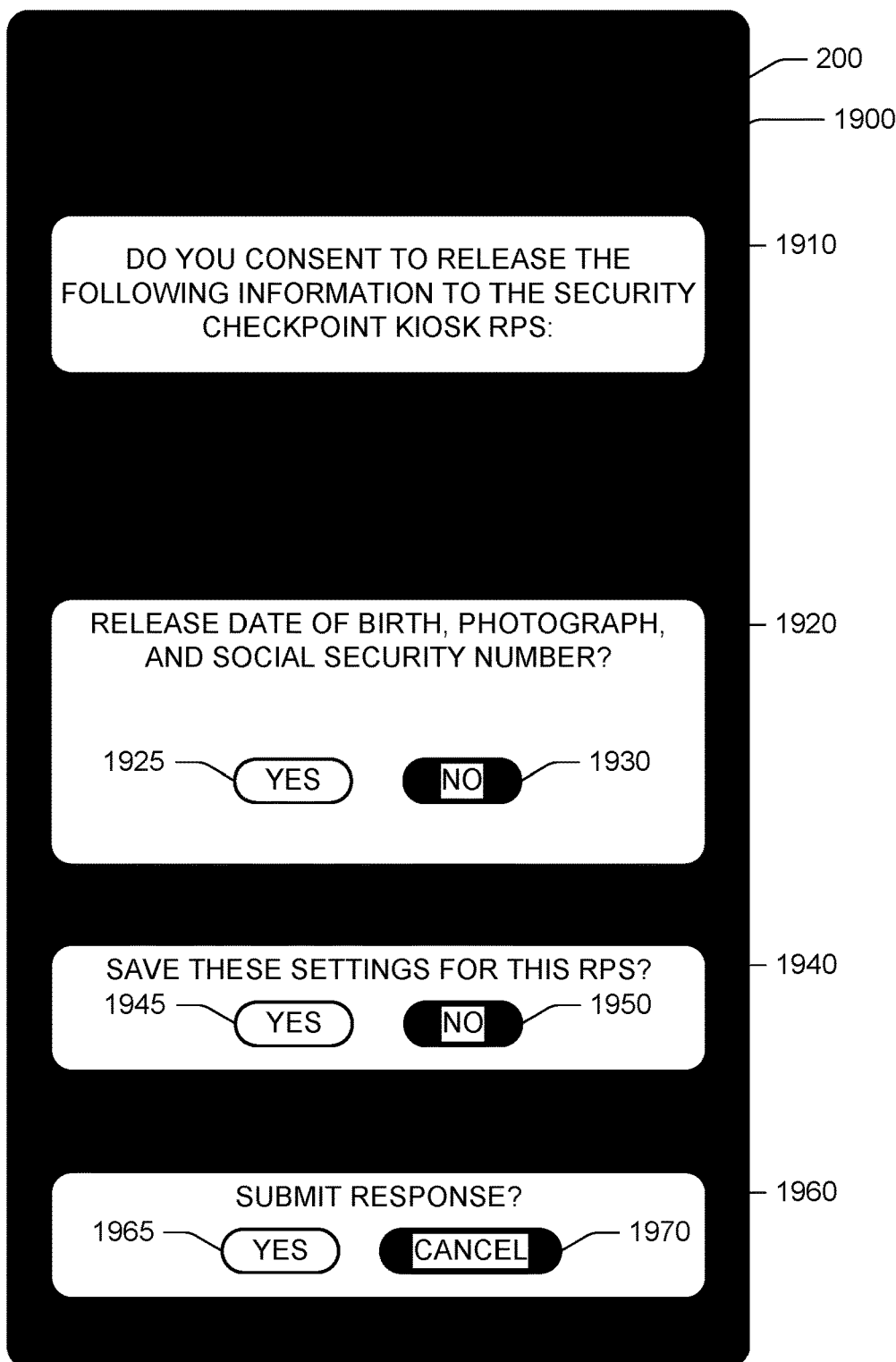
FIG. 19 illustrates a privacy dialog according to an embodiment.

FIG. 19 illustrates a privacy dialog 1900 according to an embodiment. The privacy dialog 1900 enables interaction between a user and the UMD 200, enabling the user to grant selective consent to release MIC user information. In embodiments, the UMD 200 provides the privacy dialog 1900 via APS/RPS consent logic running on the UMD 200.

The privacy dialog 1900 includes an information prompt 1910, a combination release prompt 1920, a save prompt 1940, and a submit prompt 1960. The combination release prompt 1920 enables the user to easily view which specific MIC information is requested by the RPS. Furthermore, in the illustrated embodiment, the combination release prompt 1920 serves as an indication to the user that this particular RPS requests an "all or nothing" approach to obtaining consent. In particular, the RPS is a security checkpoint kiosk that does not allow the user to proceed unless all three types of requested MIC user information are authorized/vetted. Accordingly, the combination release prompt 1920 seeks consent to release all three types of MIC user information. Such presentation saves time for the user by needing only a single consent selection, while also communicating the nature of the RPS request being of an "all or nothing" type. The combination release prompt 1920 includes a YES/NO radio button, which is illustrated in a default selection of NO to encourage a security-centric option that protects the user's MIC information from release by default. If the user agrees to release the combination of MIC information, the user selects the YES button 1925 in the combination release prompt 1920.

If the user prefers to save the settings for this interaction with this RPS, the user selects YES 1945 for the save prompt 1940. In another embodiment, the user is given the option whether to save the setting for individual prompts. In yet another embodiment, the user is initially given the option to establish default settings, such as whether to save the ability to always consent to requests from security checkpoint kiosk RPSs, always consent to government requests, and so on.

The user interacts with the submit prompt 1960 to indicate that the user is ready to release MIC user information. As illustrated, the user presses a YES button 1965 to submit the user's combination consent as indicated in the combination release prompt 1920. If the user does not agree to submit, the user presses the cancel button 1970.

Figure 20:
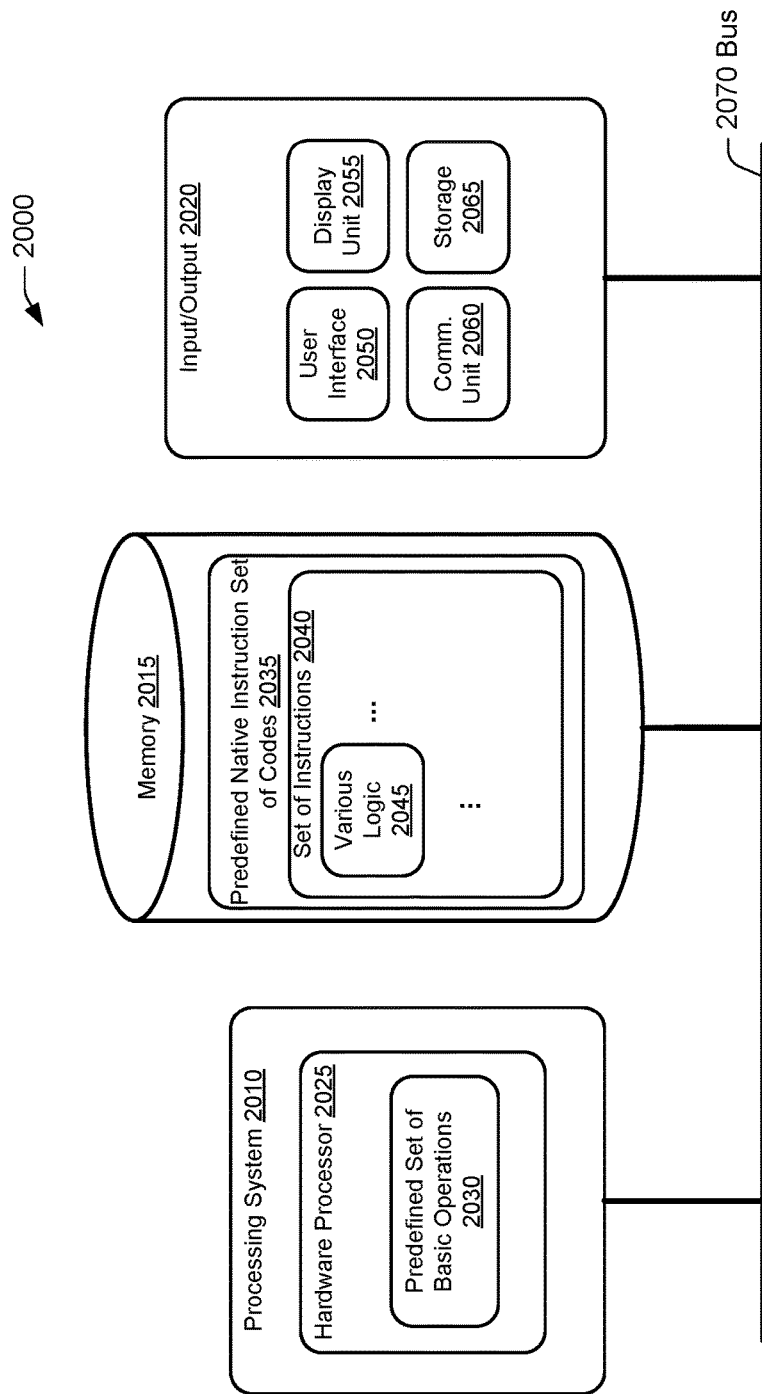
FIG. 20 illustrates a computing system including logic according to an embodiment.

FIG. 20 illustrates an apparatus or a computer system 2000, or apparatus, including logic according to an embodiment. The computer system 2000 includes a processing system 2010 having a hardware processor 2025 configured to perform a predefined set of basic operations 2030 by loading corresponding ones of a predefined native instruction set of codes 2035 as stored in the memory 2015.

Here, the term computer system includes a processing system such as processing system 2010 and a memory such as memory 2015 accessible to the processing system.

The processing system includes at least one hardware processor, and in other examples includes multiple processors and/or multiple processor cores. In one embodiment, a computer system is a standalone device. The processing system in yet another example includes processors from different devices working together. In embodiments, a computer system includes multiple processing systems that communicate cooperatively over a computer network.

The following discussion explains how the logic, that implements the foregoing operations, transforms the hardware processor of computer system 2000 into a specially-programmed electronic circuit.

A hardware processor is a complex electronic circuit designed to respond to certain electronic inputs in a predefined manner. The inputs to a hardware processor are stored as electrical charges. The hardware processor interprets the electrical charge of a given memory circuit as having one of two binary values, namely, zero or one.

A given hardware processor has electrical circuitry designed to perform certain predefined operations in response to certain ordered sets of binary values. The electrical circuitry is built of electronic circuits arranged or configured to respond to one set of ordered binary values one way and to another set of ordinary values another way, all in accordance with the hardware design of the particular hardware processor. A given set of ordered binary values to which the hardware processor is designed to respond, in a predefined manner, is an instruction.

The collection of instructions to which a given hardware processor is designed to respond, in a predetermined manner, is the native instruction set of the processor, also referred to as a native instruction set of codes. The native instruction set for one hardware processor may be different from the native instruction set for another hardware processor, depending on their manufacture. To control a given hardware processor, it is necessary to select an instruction or a sequence of instructions from the predefined native instruction set of that hardware processor.

A sequence of codes that a hardware processor is to execute, in the implementation of a given task, is referred to herein as logic. Logic is made up, therefore, not of software but of a sequence of codes or instructions, selected from the predefined native instruction set of codes of the hardware processor, and stored in the memory.

Returning to FIG. 20, the memory 2015 is accessible to the processing system 2010 via the bus 2070. The processing system controls also the input/output unit 2020 via the bus 2070. The input/output unit 2020 includes a user interface controller 2050, a display unit controller 2055, a communications unit controller 2060, and storage controller 2065.

The memory 2015 includes the predefined native instruction set of codes 2035, which constitute a set of instructions 2040 selectable for execution by the hardware processor 2025. In an embodiment, the set of instructions 2040 include logic 2045 representing the APS 300 as illustrated in FIG. 3, including the MIC generator 325, the verification system 330, and the verification API 335. In another embodiment, the set of instructions 2040 include logic 2045 representing the RPS 100 as illustrated in FIG. 4, including the UMD engagement logic 130 (a first respective sequence of instructions), the UMD information request logic 135 (a second respective sequence of instructions), the UMD verification logic 140 (a third respective sequence of instructions), and the APS verification logic 145 (a fourth respective sequence of instructions). The terms first through fourth in this paragraph do not imply any order of operation or use but are used only for discrimination of one sequence of instructions from another. In yet another embodiment, the set of instructions 2040 include logic 2045 representing the UMD 200 as illustrated in FIG. 5, including the RPS engagement logic 235, the RPS information access logic 240, the APS provisioning logic 245, and the APS/RPS consent logic 250. Such logic 2045 also is set forth above in greater detail with respect to the flowcharts illustrated in FIGS. 7-17.

The various logic 2045 is stored in the memory 2015 and comprises instructions 2040 selected from the predefined native instruction set of codes 2035 of the hardware processor 2025, adapted to operate with the processing system 2010 to implement the process or processes of the corresponding logic 2045.

Conclusion

The various networks are illustrated throughout the drawings and described in other locations throughout this disclosure, can comprise any suitable type of network such as the Internet or a wide variety of other types of networks and combinations thereof. For example, the network may include a wide area network (WAN), a local area network (LAN), a wireless network, an intranet, the Internet, a combination thereof, and so on. Further, although a single network is shown, a network can be configured to include multiple networks.

Computer storage media and/or memory includes volatile and non-volatile, removable and non-removable media and memory implemented in any method or technology for storage of information such as computer readable instructions, data structures, program modules, or other data. Computer storage media include, but are not limited to, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by a mobile device, computer, server, and so forth. For example, instructions embodying an application or program are included in one or more computer-readable storage media, such as tangible media, that store the instructions in a non-transitory manner.

Various techniques are described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media."

Certain attributes, functions, steps of methods, or sub-steps of methods described herein are associated with physical structures or components, such as a module of a physical device, that in implementations in accordance with this disclosure make use of instructions (e.g., computer executable instructions) that are embodied in hardware, such as an application specific integrated circuit, computer-readable instructions that cause a computer (e.g., a general-purpose computer) executing the instructions to have defined characteristics, a combination of hardware and software such as processor implementing firmware, software, and so forth such as to function as a special purpose computer with the ascribed characteristics.

For example, in embodiments a module comprises a functional hardware unit (such as a self-contained hardware or software or a combination thereof) designed to interface the other components of a system such as through use of an API. In embodiments, a module is structured to perform a function or set of functions, such as in accordance with a described algorithm. That this disclosure implements nomenclature that associates a particular component or module with a function, purpose, step or sub-step is used to identify the structure, which in instances includes hardware and/or software that function for a specific purpose. Invocation of 35 U.S.C. § 112(f) will be accomplished through use of ubiquitous and historically-recognized terminology for this purpose. The structure corresponding to the recited function being understood to be the structure corresponding to that function and the equivalents thereof permitted to the fullest extent of this written description, which includes the accompanying claims and the drawings as interpreted by one of skill in the art.

Although the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter. In accordance with some embodiments, information is stored in memory (at least temporarily) during performance of the methods for a variety of reasons. Example rationales include, but are not limited to, data processing convenience, communication convenience, permit batch review, records maintenance, and so on, and combinations thereof.

Although headings are used for the convenience of the reader, these are not to be taken as limiting or restricting the systems, techniques, approaches, methods, devices to those appearing in any particular section. Rather, the teachings and disclosures herein can be combined and/or rearranged with other portions of this disclosure and the knowledge of one of ordinary skill in the art. It is the intention of this disclosure to encompass and include such variation.

What is claimed is:

1. A computer system configured to communicate with a display unit, comprising:
   one or more processors; and
   memory storing one or more sets of instructions configured to be executed by the one or more processors, the one or more sets of instructions including instructions for:
   receiving a request for mobile identification credential information from an external electronic device that is separate from the computer system;
   in response to receiving the request for mobile identification credential information from the external electronic device:
      displaying, via the display unit, a first user interface that identifies one or more pieces of mobile identification credential information being requested by the external electronic device;
   subsequent to displaying the first user interface that identifies one or more pieces of mobile identification credential information being requested by the external electronic device, detecting one or more user inputs; and
   in response to detecting the one or more user inputs:
      in accordance with a determination that the one or more user inputs satisfy one or more information transmission criteria, transmitting the one or more pieces of mobile identification credential information requested by the external electronic device to the external electronic device, wherein the one or more pieces of mobile identification credential information are associated with a mobile identification credential stored on the computer system.

2. The computer system of claim 1, the one or more sets of instructions further including instructions for:

in response to detecting the one or more user inputs:
  in accordance with a determination that the one or more user inputs do not satisfy the one or more information transmission criteria, forgoing transmitting the one or more pieces of mobile identification credential information requested by the external electronic device to the external electronic device.

3. The computer system of claim 1, wherein the one or more pieces of mobile identification credential information represents a subset of mobile identification credential information associated with the mobile identification credential stored on the computer system.

4. The computer system of claim 1, wherein:
  the one or more user inputs includes biometric information corresponding to a user of the computer system; and
  the one or more sets of instructions further include instructions for:
    performing biometric information verification to verify that the biometric information corresponds to stored biometric information for the user of the computer system.

5. The computer system of claim 4, wherein the stored biometric information is stored on the computer system.

6. The computer system of claim 4, wherein performing biometric information verification includes performing facial recognition verification.

7. The computer system of claim 4, wherein the biometric information includes a fingerprint scan, and performing biometric information verification includes fingerprint verification.

8. The computer system of claim 1, the one or more sets of instructions further including instructions for:
  prior to transmitting the one or more pieces of mobile identification credential information requested by the external electronic device to the external electronic device, establishing a secure wireless communication connection between the computer system and the external electronic device.

9. A non-transitory computer-readable storage medium storing one or more sets of instructions configured to be executed by one or more processors of a computer system that is in communication with a display unit, the one or more sets of instructions including instructions for:
  receiving a request for mobile identification credential information from an external electronic device that is separate from the computer system;
  in response to receiving the request for mobile identification credential information from the external electronic device:
    displaying, via the display unit, a first user interface that identifies one or more pieces of mobile identification credential information being requested by the external electronic device;
    subsequent to displaying the first user interface that identifies one or more pieces of mobile identification credential information being requested by the external electronic device, detecting one or more user inputs; and
  in response to detecting the one or more user inputs:
    in accordance with a determination that the one or more user inputs satisfy one or more information transmission criteria, transmitting the one or more pieces of mobile identification credential information requested by the external electronic device to the external electronic device, wherein the one or more pieces of mobile identification credential information are associated with a mobile identification credential stored on the computer system.

10. The non-transitory computer-readable storage medium of claim 9, the one or more sets of instructions further including instructions for:
  in response to detecting the one or more user inputs:
    in accordance with a determination that the one or more user inputs do not satisfy the one or more information transmission criteria, forgoing transmitting the one or more pieces of mobile identification credential information requested by the external electronic device to the external electronic device.

11. The non-transitory computer-readable storage medium of claim 9, wherein the one or more pieces of mobile identification credential information represents a subset of mobile identification credential information associated with the mobile identification credential stored on the computer system.

12. The non-transitory computer-readable storage medium of claim 9, wherein:
  the one or more user inputs includes biometric information corresponding to a user of the computer system; and
  the one or more sets of instructions further include instructions for:
    performing biometric information verification to verify that the biometric information corresponds to stored biometric information for the user of the computer system.

13. The non-transitory computer-readable storage medium of claim 12, wherein the stored biometric information is stored on the computer system.

14. The non-transitory computer-readable storage medium of claim 12, wherein performing biometric information verification includes performing facial recognition verification.

15. The non-transitory computer-readable storage medium of claim 12, wherein the biometric information includes a fingerprint scan, and performing biometric information verification includes fingerprint verification.

16. The non-transitory computer-readable storage medium of claim 9, the one or more sets of instructions further including instructions for:
  prior to transmitting the one or more pieces of mobile identification credential information requested by the external electronic device to the external electronic device, establishing a secure wireless communication connection between the computer system and the external electronic device.

17. A method, comprising:
  at a computer system that is in communication with a display unit:
    receiving a request for mobile identification credential information from an external electronic device that is separate from the computer system;
    in response to receiving the request for mobile identification credential information from the external electronic device:
      displaying, via the display unit, a first user interface that identifies one or more pieces of mobile identification credential information being requested by the external electronic device;
      subsequent to displaying the first user interface that identifies one or more pieces of mobile identification credential information being requested by the external electronic device, detecting one or more user inputs; and in response to detecting the one or more user inputs:

in accordance with a determination that the one or more user inputs satisfy one or more information transmission criteria, transmitting the one or more pieces of mobile identification credential information requested by the external electronic device to the external electronic device, wherein the one or more pieces of mobile identification credential information are associated with a mobile identification credential stored on the computer system.

18. The method of claim 17, further comprising:

in response to detecting the one or more user inputs:

in accordance with a determination that the one or more user inputs do not satisfy the one or more information transmission criteria, forgoing transmitting the one or more pieces of mobile identification credential information requested by the external electronic device to the external electronic device.

19. The method of claim 17, wherein the one or more pieces of mobile identification credential information represents a subset of mobile identification credential information associated with the mobile identification credential stored on the computer system.

20. The method of claim 17, wherein:

the one or more user inputs includes biometric information corresponding to a user of the computer system; and the method further comprises:

performing biometric information verification to verify that the biometric information corresponds to stored biometric information for the user of the computer system.

21. The method of claim 20, wherein the stored biometric information is stored on the computer system.

22. The method of claim 20, wherein performing biometric information verification includes performing facial recognition verification.

23. The method of claim 20, wherein the biometric information includes a fingerprint scan, and performing biometric information verification includes fingerprint verification.

24. The method of claim 17, further comprising:

prior to transmitting the one or more pieces of mobile identification credential information requested by the external electronic device to the external electronic device, establishing a secure wireless communication connection between the computer system and the external electronic device.

* * * * *